United States Patent
Sun et al.

(10) Patent No.: US 10,945,287 B2
(45) Date of Patent: Mar. 9, 2021

(54) UPLINK (UL) TO DOWNLINK (DL) CHANNEL OCCUPANCY TIME (COT) SHARING WITH SCHEDULED UL IN NEW RADIO-UNLICENSED (NR-U)

(71) Applicant: QUALCOMM INCORPORATED, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/804,581

(22) Filed: Feb. 28, 2020

(65) Prior Publication Data

US 2020/0314899 A1    Oct. 1, 2020

(30) Foreign Application Priority Data

Mar. 29, 2019    (IN) .............................. 201941012460

(51) Int. Cl.
*H04W 72/12*    (2009.01)
*H04W 74/08*    (2009.01)
(Continued)

(52) U.S. Cl.
CPC ....... *H04W 74/0808* (2013.01); *H04L 5/0051* (2013.01); *H04L 5/10* (2013.01); *H04W 72/1268* (2013.01); *H04W 72/14* (2013.01)

(58) Field of Classification Search
CPC ............ H04W 74/0808; H04W 16/14; H04W 72/0406; H04W 72/042; H04W 72/085;
(Continued)

(56) References Cited

U.S. PATENT DOCUMENTS 10,448,420 B2 * 10/2019 Kim .................. H04W 72/1289
2016/0323849 A1    11/2016 Chu et al.
(Continued)

FOREIGN PATENT DOCUMENTS

EP        2706802 A1    3/2014
WO    2016164465 A1    10/2016

OTHER PUBLICATIONS

International Search Report and Written Opinion—PCT/US2020/020616—ISA/EPO—dated Jun. 16, 2020.

*Primary Examiner* — Phuc H Tran
(74) *Attorney, Agent, or Firm* — Liem T. Do

(57) ABSTRACT

Wireless communications systems and methods related to sharing a channel occupancy time (COT) associated with a scheduled UL transmission in a frequency spectrum shared by multiple network operating entities are provided. A first wireless communication device communicates, with a second wireless communication device, a first uplink (UL) scheduling grant. The first wireless communication device communicates, with second wireless communication device, a first UL communication signal based on the first UL scheduling grant during a first COT, the first COT based on an extended clear channel assessment (eCCA) associated with the first UL communication signal. The first wireless communication device communicates, with the second wireless communication device, a downlink (DL) communication signal during the first COT based on COT sharing information associated with the first COT.

30 Claims, 12 Drawing Sheets

(51) Int. Cl.
*H04W 72/14* (2009.01)
*H04L 5/00* (2006.01)
*H04L 5/10* (2006.01)

(58) Field of Classification Search
CPC ... H04W 74/006; H04W 88/08; H04W 8/005; H04W 72/1268; H04W 72/1289; H04L 27/26
See application file for complete search history.

(56) References Cited

U.S. PATENT DOCUMENTS

| | | | |
|---|---|---|---|
| 2017/0202022 A1 | 7/2017 | Chendamarai Kannan et al. | |
| 2017/0318607 A1* | 11/2017 | Tiirola | H04W 74/0808 |
| 2019/0373628 A1* | 12/2019 | Kim | H04W 72/1289 |
| 2020/0037292 A1* | 1/2020 | Oh | H04W 72/042 |
| 2020/0100286 A1* | 3/2020 | Xu | H04L 1/1887 |

* cited by examiner

UPLINK (UL) TO DOWNLINK (DL) CHANNEL OCCUPANCY TIME (COT) SHARING WITH SCHEDULED UL IN NEW RADIO-UNLICENSED (NR-U)

CROSS REFERENCE TO RELATED APPLICATIONS

The present application claims priority to and the benefit of Indian Provisional Patent Application No. 201941012460, filed Mar. 29, 2019, which is hereby incorporated by reference in its entirety as if fully set forth below and for all applicable purposes.

TECHNICAL FIELD

This application relates to wireless communication systems, and more particularly to sharing a channel occupancy time (COT) associated with a scheduled UL transmission in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a transmitting node (e.g., a BS or a UE) may perform a category 1 (CAT1) LBT (e.g., no LBT measurement), a category 2 (CAT2) LBT, or a category 4 (CAT4) LBT prior to transmitting a communication signal in an unlicensed frequency band. For example, a BS may acquire a COT in an unlicensed frequency band by performing a CAT4 LBT. The BS may schedule one or more UEs for UL and/or DL communication within the BS's COT. In addition, the BS may schedule one or more UEs for UL communication outside of the BS's COT. A UE with an UL schedule within the BS's COT may perform a CAT2 LBT prior to the scheduled UL transmission. A UE with an UL schedule outside of the BS's COT may perform a CAT4 LBT prior to the scheduled UL transmission.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first uplink (UL) scheduling grant; communicating, by the first wireless communication device with the second wireless communication device, a first UL communication signal based on the first UL scheduling grant during a first channel occupancy time (COT), the first COT based on an extended clear channel assessment (eCCA) associated with the first UL communication signal; and communicating, by the first wireless communication device with the second wireless communication device, a downlink (DL) communication signal during the first COT based on COT sharing information associated with the first COT.

In an additional aspect of the disclosure, an apparatus includes a transceiver configured to communicate, with a wireless communication device, a first uplink (UL) scheduling grant; communicate, with the wireless communication device, a first UL communication signal based on the first UL scheduling grant during a first channel occupancy time (COT), the first COT based on an extended clear channel assessment (eCCA) associated with the first UL communication signal; and communicate, with the wireless communication device, a downlink (DL) communication signal during the first COT based on COT sharing information associated with the first COT.

In an additional aspect of the disclosure, a non-transitory computer-readable medium having program code recorded thereon, the program code includes code for causing a first wireless communication device to communicate, with a second wireless communication device, a first uplink (UL) scheduling grant; code for causing the first wireless communication device to communicate, with the second wireless communication device, a first UL communication signal based on the first UL scheduling grant during a first channel occupancy time (COT), the first COT based on an extended clear channel assessment (eCCA) associated with the first UL communication signal; and code for causing the first wireless communication device to communicate, with the second wireless communication device, a downlink (DL) communication signal during the first COT based on COT sharing information associated with the first COT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
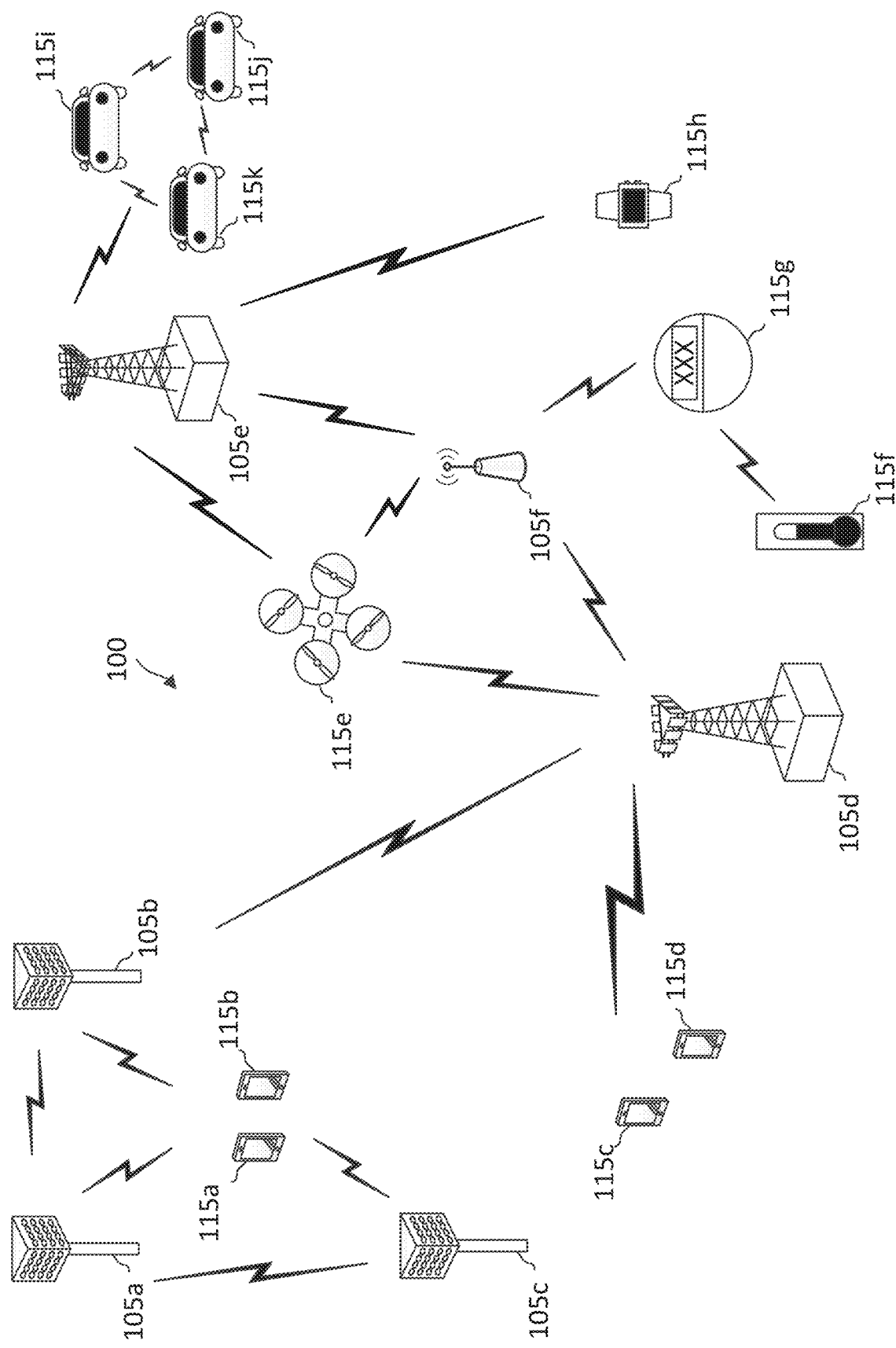
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW).

For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for sharing a COT associated with a scheduled UL transmission in a frequency spectrum shared by multiple network operating entities. For example, a base station (BS) transmits a UL scheduling grant granting a UE with a UL schedule outside of a COT of the BS. Upon receiving the UL scheduling grant, the UE performs a CAT4 LBT prior to the UL schedule. Upon passing the LBT, the UE gains a COT and transmits a UL communication signal according to the schedule.

In an embodiment, the UE may include COT sharing information in the UL communication signal to enable the BS to share the UE's COT for DL communications. The COT sharing information may indicate a starting time and/or a duration of a portion of the UE's COT sharable by the BS. The BS may transmit a DL communication to the UE during the sharable portion.

In an embodiment, the BS may indicate a traffic priority class for the UL schedule. The UE may select a different traffic priority class for the UL schedule, transmit data of the selected traffic priority to the BS, and indicate the traffic priority used for the UL transmission in the UL communication signal. In an embodiment, the UE may perform multiple hypotheses associated with channel access and packet generation for the UL transmission.

In an embodiment, the BS may determine COT sharing information based on the UL scheduling grant and/or a detection of a UL communication signal based on the UL scheduling grant.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs), channel state information-reference signals (CSI-RSs), and/or demodulation reference signals (DMRSs) to enable a UE 115 to estimate a DL channel. Similarly, a UE 115 may transmit sounding reference signals (SRSs) and/or DMRSs to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a MIB, remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) in the shared channel by performing a CAT4 LBT. A CAT4 LBT refers to an LBT with a random backoff and a variable contention window. Upon passing the LBT, the BS 105 may schedule one or more UEs 115 for DL communications and/or UL communications within the acquired COT as described in greater detailer herein. An LBT may also be referred to as a clear channel assessment (CCA), where energy detection and/or signal detection may be used to determine whether a channel is idle or busy. A CAT4 LBT may be referred to as an extended clear channel assessment (eCCA), where backoff mechanisms may be used with CCA.

Figure 2:
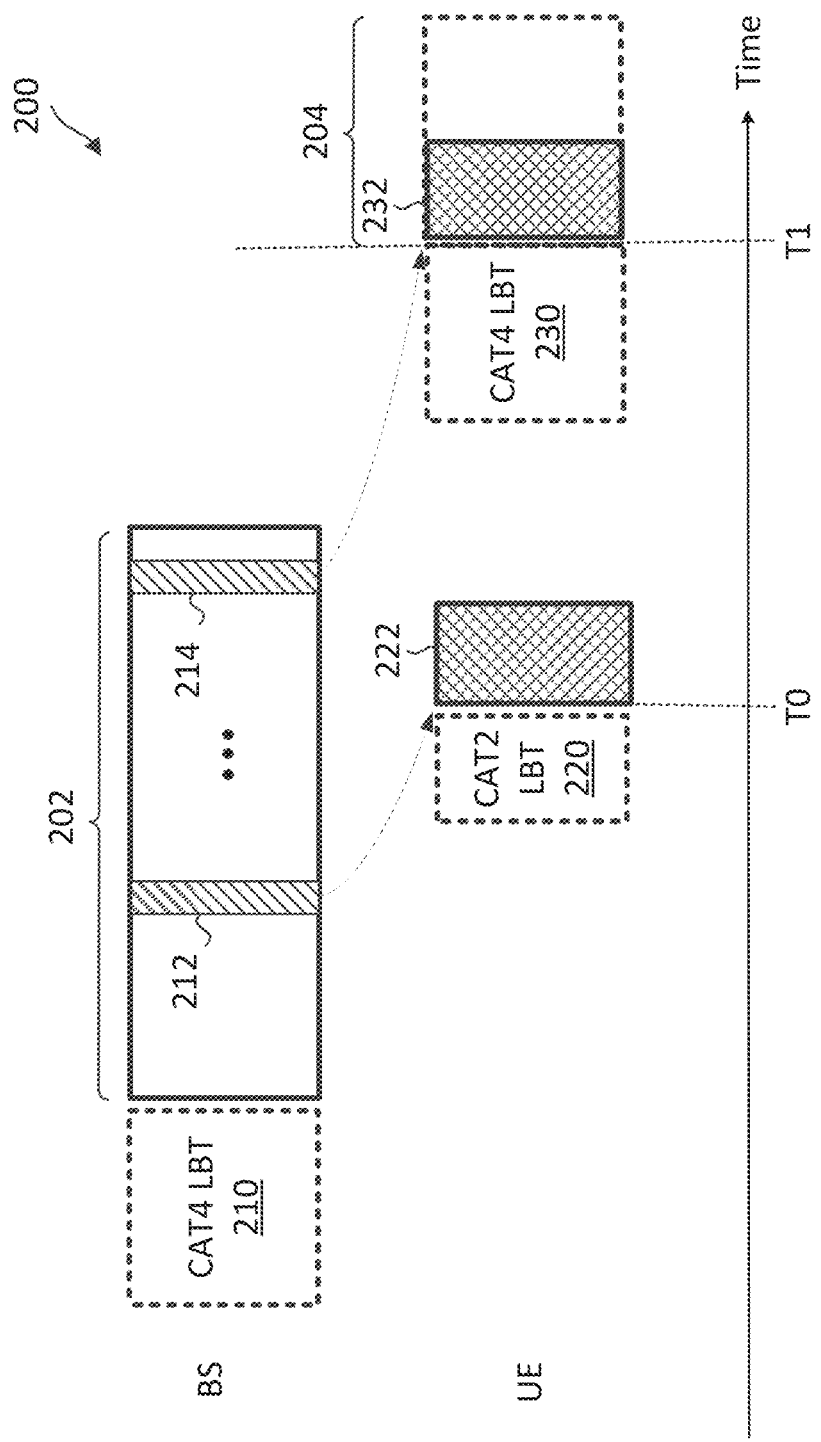
FIG. 2 is a timing diagram illustrating a communication scheme according to some embodiments of the present disclosure.

FIG. 2 is a timing diagram illustrating a communication scheme 200 according to some embodiments of the present disclosure. The scheme 200 may be employed by BSs such as the BSs 105 and UEs such as the UEs 115 in a network such as the network 100. In particular, a BS may employ the scheme 200 to schedule a UE for UL communications in a frequency spectrum (e.g., an unlicensed spectrum or a shared spectrum) shared by multiple network operating entities. In FIG. 2, the x-axis represent time in some arbitrary units.

In the scheme 200, a BS (e.g., BS 105 in FIG. 1) contends for a COT 202 by performing a CAT4 LBT 210 in a shared channel. Upon passing the CAT4 LBT 210, the COT 202 may begin. The BS may schedule the UE for UL and/or DL communications during the COT 202. As shown, the BS transmits a UL scheduling grant 212 to schedule the UE for a UL communication at a time T0 within the COT 202. The scheduling grant 212 may indicate resources (e.g., time-frequency resources) allocated for the UL communication and/or transmission parameters for the UL communication. Upon receiving the UL scheduling grant 212, the UE performs a CAT2 LBT 220 prior to the scheduled time T0. A CAT2 LBT refers to an LBT without a random backoff A CAT2 LBT may also be referred to as a one-shot LBT. At time T0, upon passing the CAT2 LBT 220, the UE transmits a UL communication signal 222 based on the UL scheduling grant 212. The UL communication signal 222 can include UL data and/or UL control information. In an example, the UL data may be carried in a PUSCH the UL control information may carried in a PUCCH. The UL control information may include scheduling request, channel information (e.g., CSI reports), and/or hybrid automatic repeat request (HARQ) acknowledgement/negative-acknowledgement (ACK/NACK) feedbacks.

Additionally, the BS transmits a UL scheduling grant 214 to schedule the UE for another UL communication at a time T1 outside of the COT 202. Upon receiving the UL scheduling grant 214, the UE performs a CAT4 LBT 230 prior to the scheduled time T0. At time T1, upon passing the CAT4 LBT 230, the UE transmits a UL communication signal 232 based on the UL scheduling grant 214. In other words, the UE gains a COT 204 outside of the BS's COT 202 for the transmission of the UL communication signal 232. The UL scheduling grant 214 and the UL communication signal 232 may be substantially similar to the scheduling grant 212 and the UL communication signal 232, respectively.

The UE may perform the CAT2 LBT 220 for the transmission of the UL communication signal 222 based on the schedule for the UL communication signal 222 being within the BS's COT 202. The UE may perform the CAT4 LBT 230 for the transmission of the UL communication signal 232 based on the schedule for the UL communication signal 232 being outside of the BS's COT 202.

A COT (e.g., the COTs 202 and/or 204) acquired from a CAT4 LBT (e.g., the CAT4 LBTs 210 and/or 230) may be allowed to have a certain COT duration based on regulation for the spectrum in use. For example, the COT duration may be dependent on the contention window length (e.g., a time duration) used for the CAT4 LBT. A transmitting node may perform a random backoff by drawing a random number in a range of the contention window length and backoff for a time period based on the random number. The UE may set a counter with the drawn random number. If the channel remains idle for the duration of the backoff period, the transmitting node may transmit at the end of the backoff period (e.g., when the counter counts to zero). In an embodiment, the UE in FIG. 2 may not use the entire duration of the COT 204 for transmitting the UL communication signal 232. As an example, the COT 204 may have a duration of about 6 milliseconds (ms), but the scheduled UL communication signal 232 may span a duration of about 2 ms. Thus, the remaining 4 ms may be unused.

Accordingly, the present disclosure provides techniques for a UE gaining a COT (e.g., the COT 204) outside of a BS's COT (e.g., the COT 202) for an UL scheduled transmission (e.g., the UL communication signal 232) to share the UE's COT with the BS for DL communication.

Figure 3:
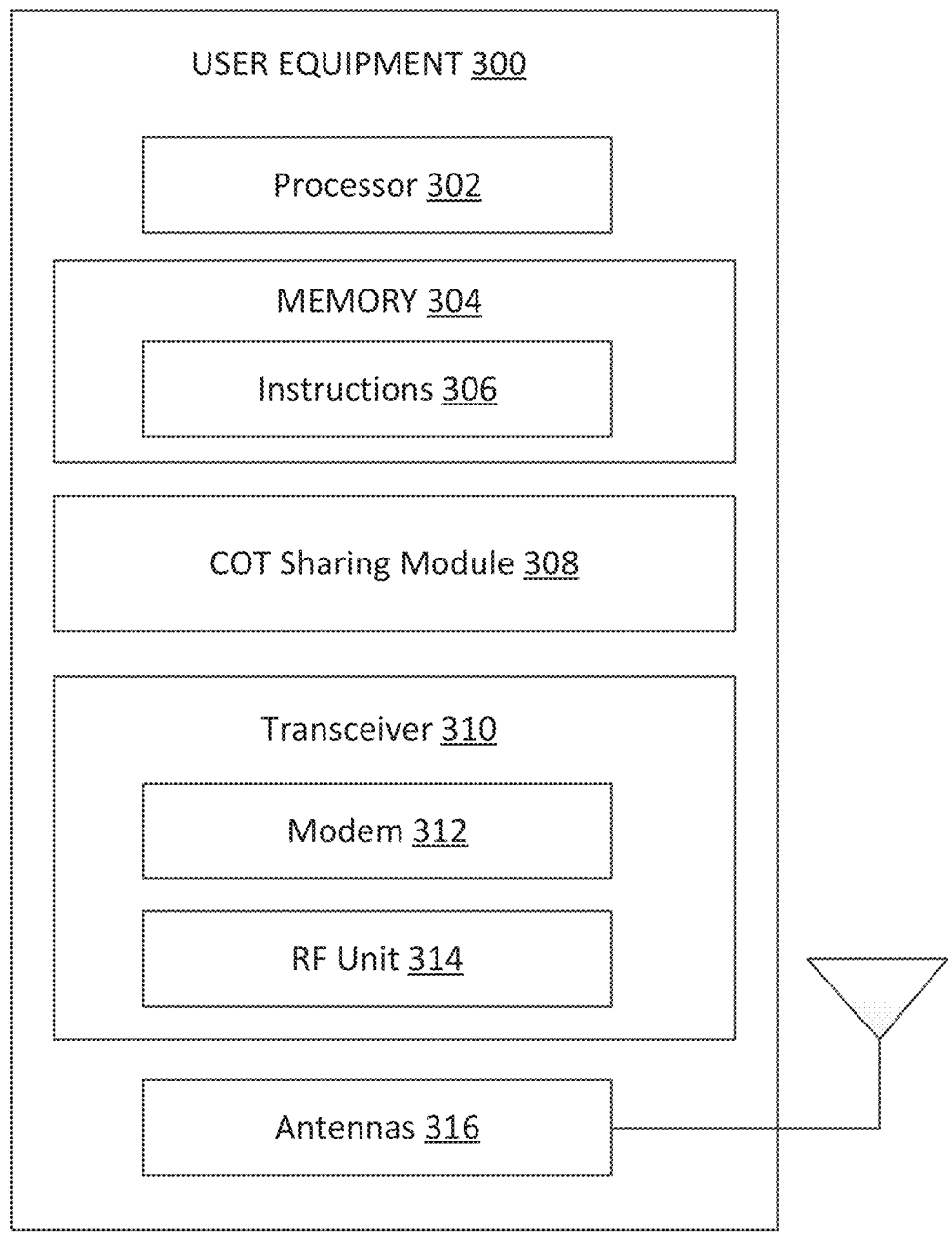
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a COT sharing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIGS. 2 and 5-12. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 308 may be implemented via hardware, software, or combinations thereof. For example, the COT sharing module 308 may be implemented as a processor, circuit, and/or instructions 306 stored in the memory 304 and executed by the processor 302. The COT sharing module 308 may be used for various aspects of the present disclosure, aspects of FIGS. 2 and 5-12. For example, the COT sharing module 308 is configured to receive a UL scheduling grant from a BS (e.g., BS 105 in FIG. 1) granting a UL schedule outside of a COT of the BS and perform a CAT4 LBT to acquire a COT prior to transmitting a UL communication signal according to the UL schedule, determine information for sharing a portion of the COT with the when the CAT4 LBT is a pass, generate a UL communication signal including the COT sharing information, and/or transmit the UL communication signal according to the UL schedule.

In an embodiment, the COT sharing module 308 is further configured to select a traffic priority class different than a traffic priority class assigned to the UL schedule the UL transmission. In an embodiment, the COT sharing module 308 is further configured to perform multiple hypotheses associated with channel access and packet generation for the UL transmission. Mechanisms for sharing a UE's COT acquired for a scheduled UL transmission with a BS are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the COT sharing module 308, according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement RATs.

Figure 4:
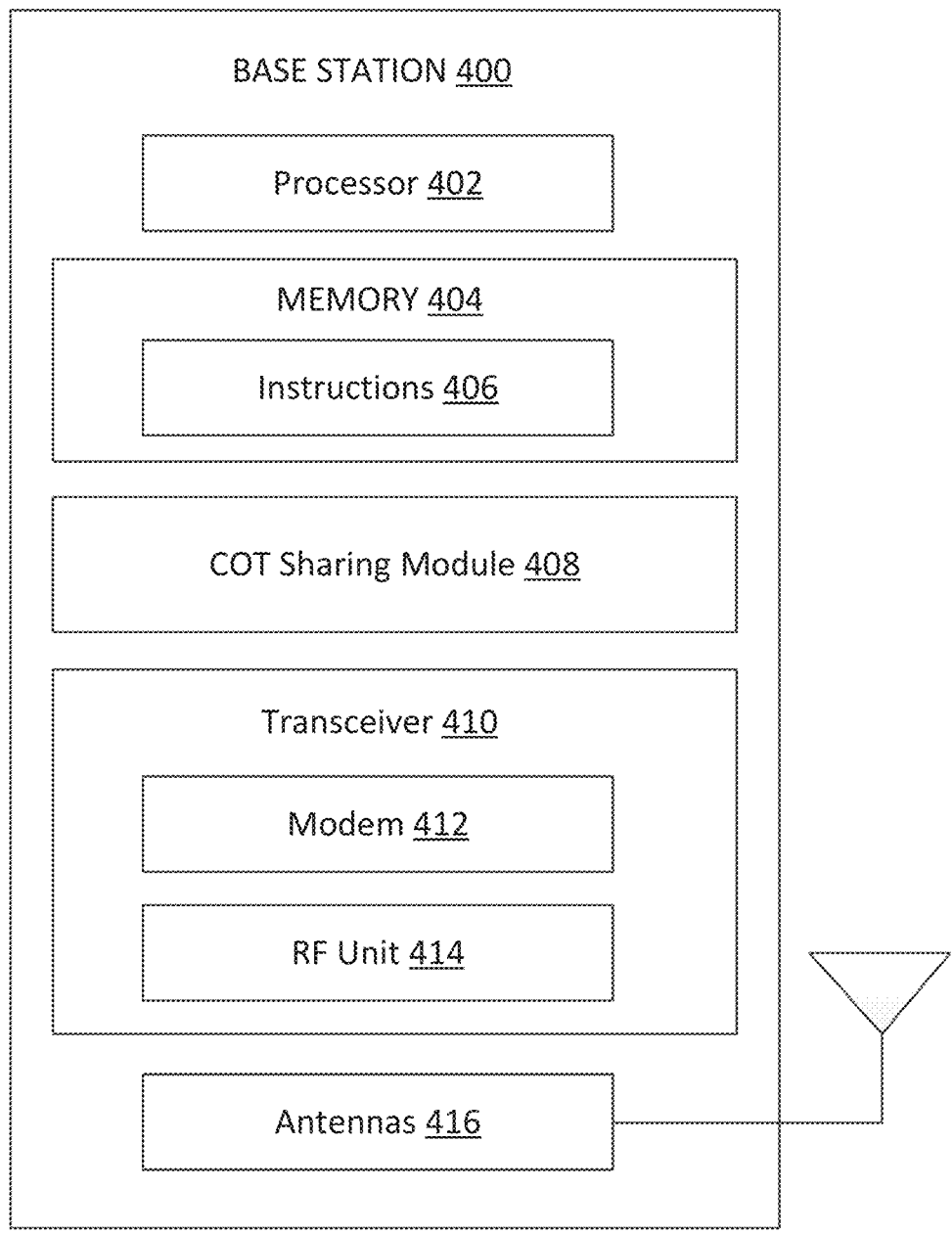
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above in FIG. 1. A shown, the BS 400 may include a processor 402, a memory 404, a COT sharing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2 and 5-12. Instructions 406 may also be referred to as code, which may be interpreted broadly to include any type of computer-readable statement(s) as discussed above with respect to FIG. 3.

The COT sharing module 408 may be implemented via hardware, software, or combinations thereof. For example, the COT sharing module 408 may be implemented as a processor, circuit, and/or instructions 406 stored in the memory 404 and executed by the processor 402. The COT sharing module 408 may be used for various aspects of the present disclosure, aspects of FIGS. 2 and 5-12. For example, the COT sharing module 408 is configured to transmit a UL scheduling grant to a UE (e.g., UE 115 or UE 300) granting a UL schedule outside of a COT of the BS 400, receive a UL communication signal, receive a UL communication signal from the BS based on the UL schedule, decode COT sharing information from the UL communication signal, and transmit a DL communication signal to the UE using a sharable portion of the UE's COT indicated by the COT sharing information.

In an embodiment, the COT sharing module 308 is further configured to obtain a traffic priority class associated with UL data carried by the UL communication signal. In an embodiment, the COT sharing module 308 is further configured to determine COT sharing information based on the UL scheduling grant and a detection of UL communication signal according to the UL scheduling grant. Mechanisms for sharing a UE's COT acquired for a scheduled UL transmission with a BS are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 400 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement RATs.

Figure 5:
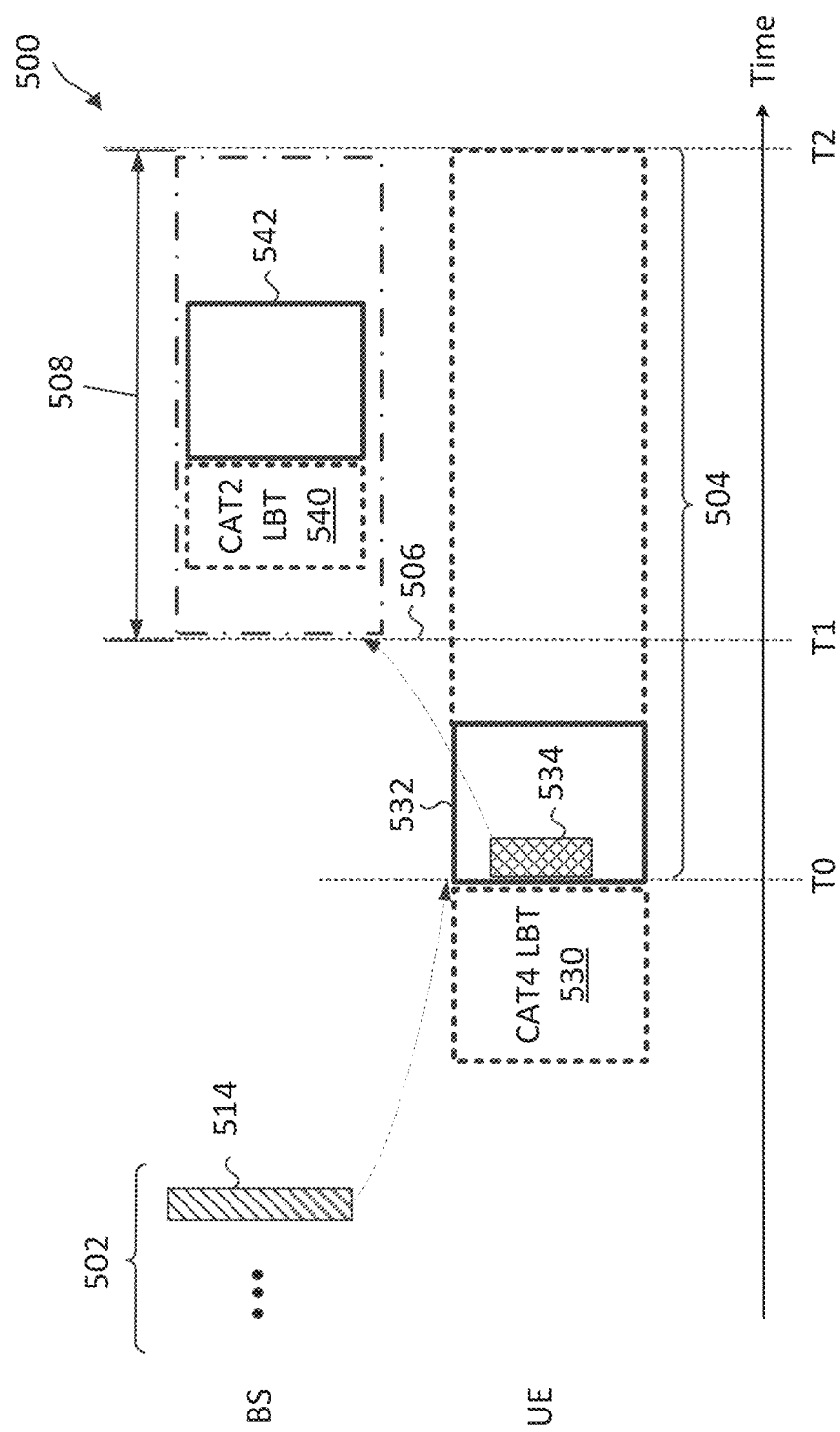
FIG. 5 is a timing diagram illustrating a scheme for sharing a channel occupancy time (COT) associated with a scheduled UL transmission according to some embodiments of the present disclosure.

FIG. 5 is a timing diagram illustrating a scheme 500 for sharing a COT associated with a scheduled UL transmission according to some embodiments of the present disclosure. The scheme 500 may be employed by BSs such as the BSs 105 and UEs such as the UEs 115 in a network such as the network 100. In particular, a BS and a UE may employ the scheme 500 for UL-to-DL COT sharing in a frequency spectrum (e.g., an unlicensed spectrum or a shared spectrum) shared by multiple network operating entities. In FIG. 5, the x-axis represent time in some arbitrary units. In the scheme 500, a UE (e.g., UE 115 in FIG. 1) may initiate a COT based on an UL schedule received from a BS (e.g., BS 105 in FIG. 1) and share the COT with the BS. for DL communication. The BS and the UE may use substantially similar LBT mechanisms as in the scheme 200 described in FIG. 2 to acquire a COT.

As shown, the BS acquires a COT 502. The BS transmits a UL scheduling grant 514 in the COT 502 to schedule the UE for a UL transmission at a time T0 outside of the BS's COT 502. The UE performs a CAT4 LBT 530 prior to the scheduled time T0. Upon passing the LBT 530, the UE gains a COT 504 and transmits a UL communication signal 532 beginning at the scheduled time T0 according to the UL scheduling grant 514. The COT 504 may include a duration longer than the transmission duration of the UL communication signal 532. For example, the COT 504 may end at time T2 based on a contention window length used for performing the CAT4 LBT 530.

Accordingly, the UE may share the COT 504 with the BS for DL communication. In an embodiment, the UE includes COT sharing information 534 in the UL communication signal 532. The COT sharing information 534 may indicate that the BS is allowed to share the UE's COT 504 for communication. The COT sharing information 534 may indicate a sharable portion of the UE's COT 504 starting at a time 506 (e.g., at time T1) with a duration 508 as shown by the dashed-dotted box. In the context 5G or NR, the UL communication signal 532 may be a PUSCH signal and the COT sharing information 534 may be a PUCCH signal or a UL control information (UCI) message.

Upon receiving the COT sharing information 534, the BS performs a CAT2 LBT 540 and transmits a DL communication signal 542 during a period within the sharable duration 508. The DL communication signal 542 may include DL control information (e.g., DL scheduling grants) and/or DL data. In an embodiment, the BS may be allowed to use the UE's COT 504 for DL and/or UL communications with the UE and may not be allowed to use the UE's COT 504 for communication with another UE (e.g., UE 115 in FIG. 1). In an embodiment, the BS may be allowed to use the UE's COT 504 for DL communication with another UE (e.g., UE 115 in FIG. 1) after communicating with the UE.

In an embodiment, the BS may be allowed to use the UE's COT 504 for communications of a certain traffic priority. For example, the UL communication signal 532 may include UL data of a certain traffic priority. The BS may be allowed to use the UE's COT 504 to transmit DL data of a higher priority than the UL data or DL data of an equal priority as the UL data.

Figure 6:
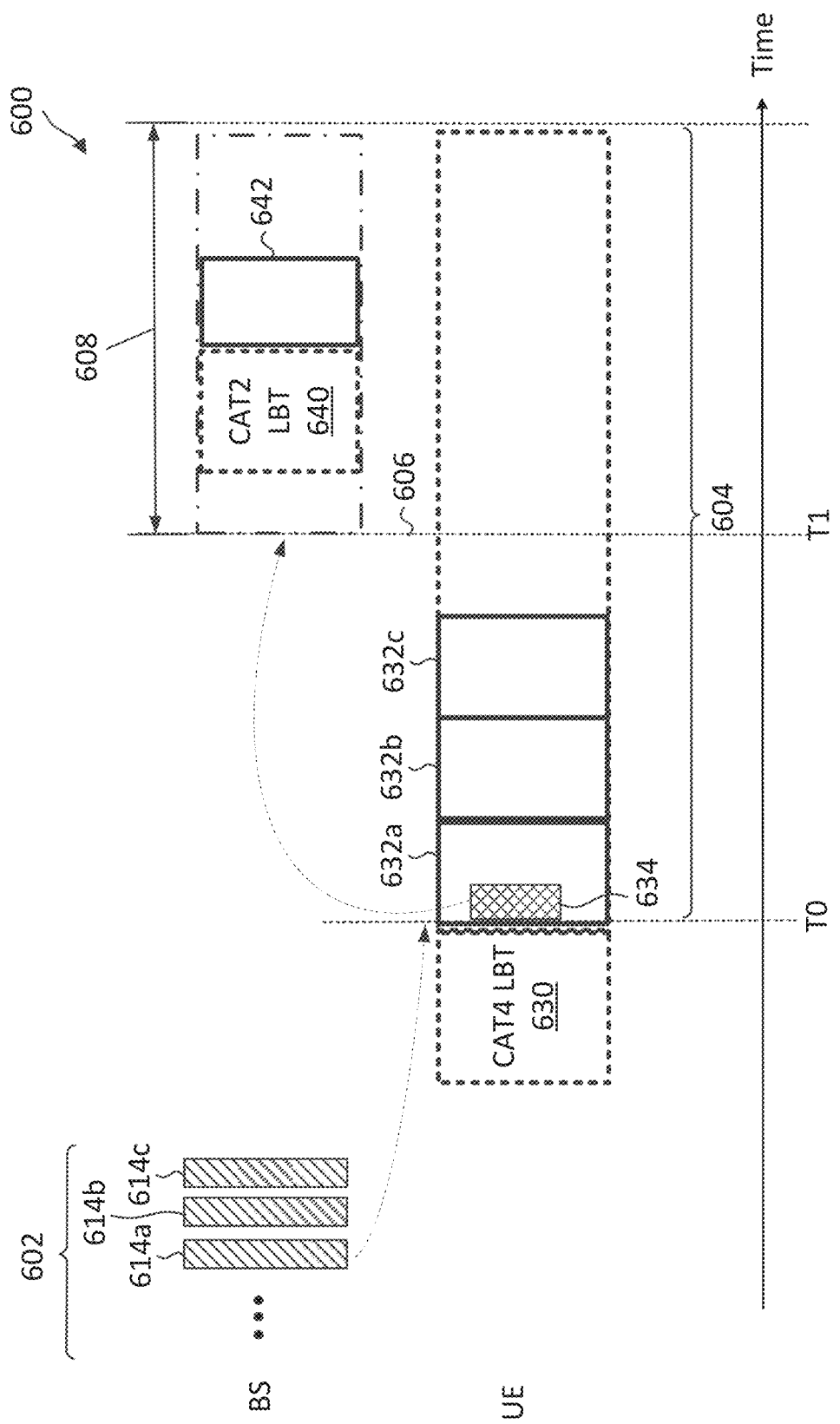
FIG. 6 is a timing diagram illustrating a scheme for sharing a COT associated with a scheduled UL transmission according to some embodiments of the present disclosure.

FIG. 6 is a timing diagram illustrating a scheme 600 for sharing a COT associated with a scheduled UL transmission according to some embodiments of the present disclosure. The scheme 600 may be employed by BSs such as the BSs 105 and UEs such as the UEs 115 in a network such as the network 100. In particular, a BS and a UE may employ the scheme 600 for UL-to-DL COT sharing in a frequency spectrum (e.g., an unlicensed spectrum or a shared spectrum) shared by multiple network operating entities. In FIG. 6, the x-axis represent time in some arbitrary units. The scheme 600 is substantially similar to the scheme 500 and illustrates a scenario where a BS (e.g., BS 105 in FIG. 1) may schedule a UE (e.g., UE 115 in FIG. 1) with back-to-back UL transmissions outside of a COT of the BS. The BS and the UE may use substantially similar LBT mechanisms as in the scheme 200 described in FIG. 2 to acquire a COT.

As shown, the BS acquires a COT 602. The BS transmits a plurality of UL scheduling grants 614 (shown as 614a, 614b, and 614c) in the COT 602 to schedule the UE for UL transmissions in consecutive periods or transmission slots outside of the BS's COT 502. The consecutive periods begin at time T0. The UE performs a CAT4 LBT 630 prior to the scheduled time T0. Upon passing the LBT 630, the UE gains a COT 604 and transmits UL communication signal 632a, 632b, and 632c (e.g., including UL data and/or UL control information) according to the UL scheduling grants 614a, 614b, and 614c, respectively.

Similar to the scheme 500, the UE may share a portion of the COT 604 after the last UL communication signal 632c. In an embodiment, the UE may include COT sharing information 634 in one of the back-to-back UL communication signals 632a, 632b, 632c. As shown, the UL communication signal 632a may include the COT sharing information 634 and the other UL communication signals 632b and 632c do not include the COT sharing information 634. The COT sharing information 634 may be substantially similar to the COT sharing information 534. For example, the COT sharing information 634 may indicate a sharable portion of the UE's COT 604 starting at a time 606 (e.g., at time T1) with a duration 608 as shown by the dashed-dotted box.

The BS may share the UE's COT 604 using substantially similar mechanisms as in the scheme 500 described in FIG. 5. For example, the BS performs a CAT2 LBT 640. Upon passing the CAT2 LBT 640, the BS transmits a DL communication signal 642 (e.g., including DL data and/or DL control information) to the UE during a period within the sharable duration 608.

In an embodiment, the BS may include a trigger or a request for the COT sharing information 634 in a corresponding UL scheduling grant 614. For example, the BS may include a request for the COT sharing information 634 in the UL scheduling grant 614a and may not include a request for the COT sharing information 634 in the UL scheduling grants 614b and 614c.

In an embodiment, the BS may bundle a COT sharing UCI with other UCI transmissions. For example, the BS may include a trigger for a bundled UCI in the UL scheduling grant 614a. The trigger may request the UE to transmit the COT sharing information 634 and ACK/NACK feedbacks and/or channel information (e.g., CSI reports). In some instances, the ACK/NACK feedbacks may be associated with HARQ processes used for DL data transmissions and retransmissions.

Figure 7:
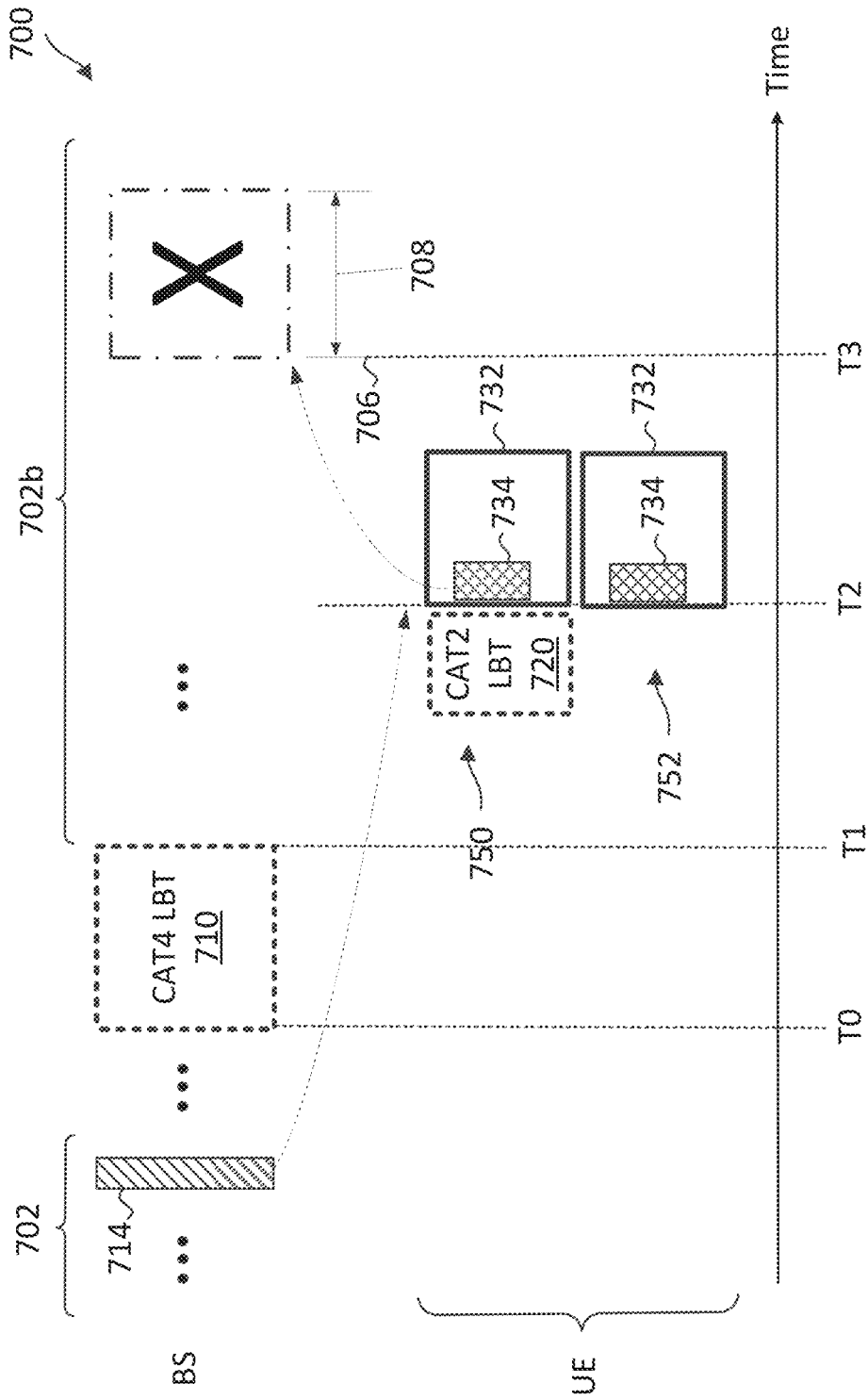
FIG. 7 is a timing diagram illustrating a scheme for sharing a COT associated with a scheduled UL transmission according to some embodiments of the present disclosure.

FIG. 7 is a timing diagram illustrating a scheme 700 for sharing a COT associated with a scheduled UL transmission according to some embodiments of the present disclosure. The scheme 700 may be employed by BSs such as the BSs 105 and UEs such as the UEs 115 in a network such as the network 100. In particular, a BS and a UE may employ the scheme 700 for UL-to-DL COT sharing in a frequency spectrum (e.g., an unlicensed spectrum or a shared spectrum) shared by multiple network operating entities. In FIG. 7, the x-axis represent time in some arbitrary units. The scheme 700 is substantially similar to the scheme 500. However, in the scheme 700, a BS (e.g., BS 105 in FIG. 1) may initially grant a UL schedule for a transmission outside of a COT of the BS, but may subsequently contend and gain another COT before the UL schedule, causing the UL schedule to fall back into the BS's COT. The BS and the UE may use substantially similar LBT mechanisms as in the scheme 200 described in FIG. 2 to acquire a COT.

As shown, the BS acquires a COT 702. The BS transmits a UL scheduling grant 714 in the COT 702 to schedule the UE for a UL transmission at a time T2 outside of the BS's COT 702. Upon detecting the UL scheduling grant 714, the UE may generate a UL communication signal 732 based on the UL scheduling grant 714 and may include COT sharing information 734 in the UL communication signal 732. The UE may determine the COT sharing information 734 based on the UL scheduling grant 714. For example, the UE may determine a duration of a potential COT if the UE passes a CAT4 LBT similar to the CAT4 LBTs 230, 530, and 630. The UE may determine a starting time 706 (e.g., a time T3) and/or a duration 708 for a portion (shown as dashed-dotted box) of the potential COT that may be shared with the BS using similar mechanism as in the scheme 500 described above in FIG. 5. The UE may generate the COT sharing information 734 based on the determined starting time and the determined duration for the sharable portion of the COT.

At time T0, the BS contends for another COT before the scheduled time T2 by performing a CAT4 LBT 710 similar to the CAT4 LBT 210 at time T0. At time T1, upon passing the CAT4 LBT 710, the BS gains another COT 702 (shown as 702b). Thus, the initial UL schedule beginning at time T2 granted by the UL scheduling grant 714 is no longer outside of a COT of the BS. Instead, the UL schedule is within the new BS's COT 702b. The UE may detect the start of the BS's COT 702b, for example, by monitoring for reference signals (e.g., DMRSs) and/or COT structure information signal. A COT structure information signal may include a COT duration and/or slot format information for slots within the COT.

Upon detecting the start of the BS's COT 702b and that the UL schedule (e.g. scheduled by the UL scheduling grant 714) is within the BS's COT 702b, the UE may perform a CAT2 LBT 720 similar to the CAT2 LBT 220 or no LBT before transmitting the UL communication signal 732 at the scheduled time T2. The UE may determine whether to perform a CAT2 LBT 720 or no LBT based on a transmission gap between the scheduled time T2 and a last transmission in the channel. When the transmission gap is short (e.g., shorter than about 16 microseconds (μs)), the UE may not perform an LBT prior to transmitting the UL communication signal 732 as shown by 752. When the transmission gap is long (e.g., longer than about 16 μs), the UE may perform a CAT2 LBT 720 prior to transmitting the UL communication signal 732 as shown by 750.

Since the UL schedule for transmitting the UL communication signal 732 falls back into the BS's COT 702b, the UE may not be allowed to share the initially computed sharable COT with the BS as shown by the cross. The generation of the UL communication signal 732 may take time. The UE may have generated the UL communication signal 732 including the COT sharing information 734 before detecting the start of the BS's COT 702b. Thus, the UE may proceed to transmit the generated UL communication signal 732 at the scheduled time T2. Upon receiving the UL communication signal 732 including the COT sharing information 734, the BS may disregard the COT sharing information 734 when the UL communication signal 732 is received within a duration of the BS's COT 702b. In some instances, when there is a sufficient amount of time between the time when the UE detected the start of the BS's COT 702b and the start of the UL schedule, the UE may generate another UL communication signal 732 without the COT sharing information 734 and transmit the UL communication signal 732 without the COT sharing information 734.

Figure 8:
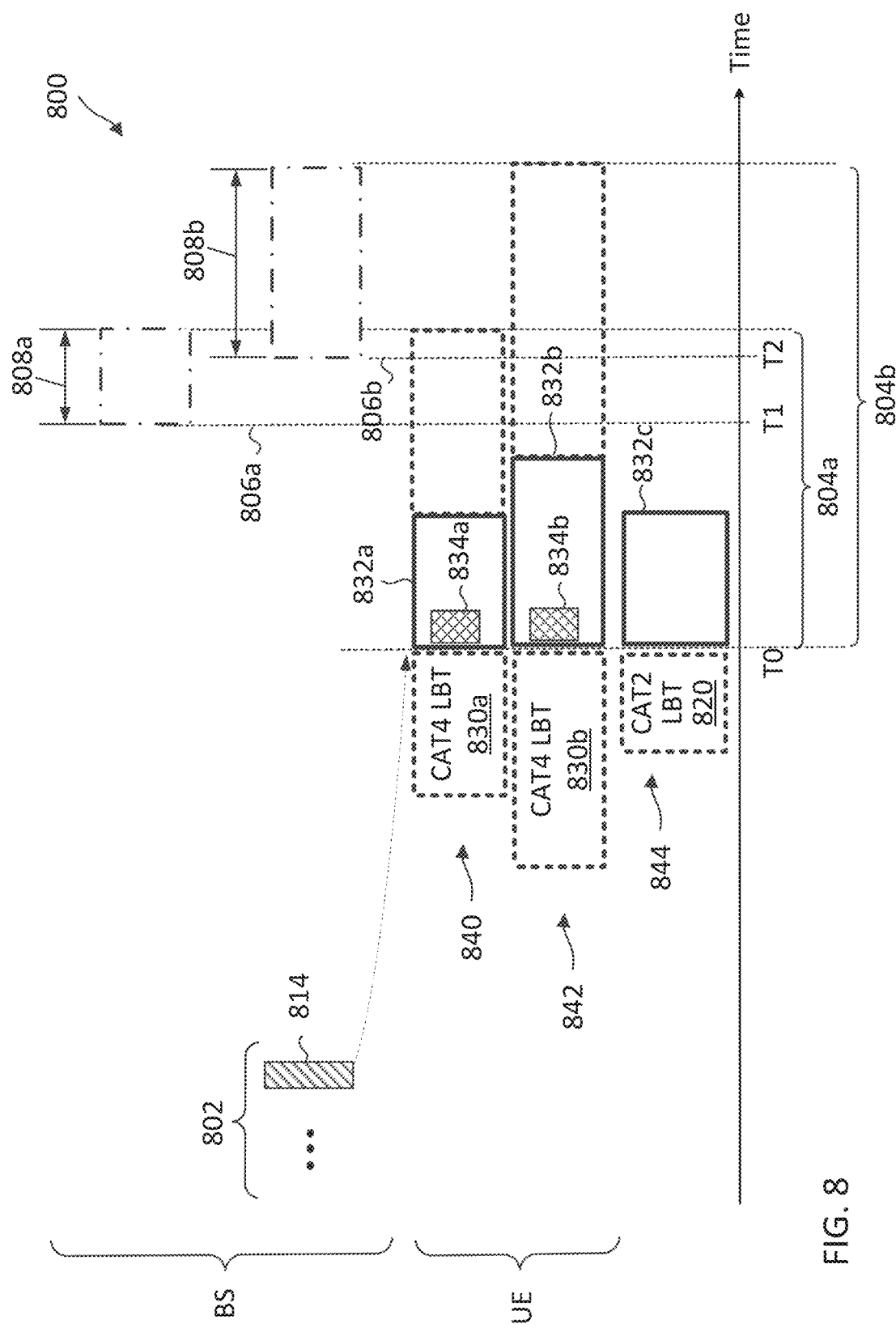
FIG. 8 is a timing diagram illustrating a scheme for sharing a COT associated with a scheduled UL transmission according to some embodiments of the present disclosure.

FIG. 8 is a timing diagram illustrating a scheme 800 for sharing a COT associated with a scheduled UL transmission according to some embodiments of the present disclosure. The scheme 800 may be employed by BSs such as the BSs 105 and UEs such as the UEs 115 in a network such as the network 100. In particular, a BS and a UE may employ the scheme 800 for UL-to-DL COT sharing in a frequency spectrum (e.g., an unlicensed spectrum or a shared spectrum) shared by multiple network operating entities. In FIG. 8, the x-axis represent time in some arbitrary units. The scheme 800 is substantially similar to the scheme 500. However, the scheme 800 provides a UE (e.g., UE 115 in FIG. 1) with the flexibility to modify a traffic priority assigned by a BS (e.g., BS 105 in FIG. 1) when a UL schedule is outside of a COT of the BS. The BS and the UE may use substantially similar LBT mechanisms as in the scheme 200 described in FIG. 2 to acquire a COT.

As shown, the BS acquires a COT 802. The BS transmits a UL scheduling grant 814 in the COT 802 to schedule the UE for a UL transmission at a time T0 outside of the BS's COT 802. The UL scheduling grant 814 may include a traffic priority or data priority assigned for the UL transmission in addition resources and transmission configuration parameters.

In a first scenario 840, the UE may perform a CAT4 LBT 830a prior to the scheduled time T0. The UE may perform the CAT4 LBT 830a by configuring a random backoff period based on a contention window length associated with the assigned traffic priority. Upon passing the CAT4 LBT 830a, the UE gains a COT 804a and transmits a UL communication signal 832a including UL data of the assigned traffic priority or priority class beginning at the scheduled time T0. The UE may include COT sharing information 834a in the UL communication signal 832a using similar mechanisms as in the scheme 500 described in FIG. 5. The COT sharing information 834a may indicate a sharable portion of the UE's COT 804a starting at a time 806a (e.g., at time T1) with a duration 808a as shown by the dashed-dotted box.

In a second scenario 842, the UE may determine to transmit UL data of another traffic priority using the UL schedule granted by the UL scheduling grant 814. The UE may determine to use the granted UL schedule for a lower traffic priority than the assigned priority. The UE performs a CAT4 LBT 830b based on a contention window length associated with the determined traffic priority. The contention window length for a lower traffic priority may be longer. As shown, the UE performs the CAT4 LBT 830b with a longer contention window length than the CAT4 LBT 830a. Upon passing the CAT4 LBT 830b, the UE gains a COT 804b. The COT 804b has a longer duration than the COT 804a based on the CAT4 LBT 830b having a longer contention window length. The UE may transmit a UL communication signal 832b including UL data of the determined lower traffic priority beginning at the scheduled time T0. The UE may include COT sharing information 834b in the UL communication signal 832b using similar mechanisms as in the scheme 500 described in FIG. 5. The COT sharing information 834b may indicate a sharable portion of the UE's COT 804b starting at a time 806b (e.g., at time T1) with a duration 808b as shown by the dashed-dotted box. The COT sharing information 834b may additionally indicate the traffic priority of the UL data included in the UL communication signal 832b and/or any other information related to the transmission of the UL communication signal 832b. The BS may decode the UL data according to the additional traffic priority and/or the other transmission information.

In a third scenario 844, the BS may contend for another COT before the scheduled time T0 and may gain another COT 802 (shown as 802b). Thus, the UL schedule granted by the UL scheduling grant 814 is within the BS's COT 802b. Upon detecting the COT 802b and determining that the UL schedule is within the BS's COT 802b, the UE may perform a CAT2 LBT 820 and transmits a UL communication signal 832c beginning at the scheduled time T0. The UE may not be allowed to change the traffic priority when the UL schedule falls back into the BS's COT 802b. Thus, the communication signal 832c include UL data of the assigned traffic priority. Similar to the scheme 700, no UL-to-DL COT sharing is allowed when the UL schedule falls back into the BS's COT 802b. Thus, the UL communication signal 832c may not include COT sharing information. In some instances, after the BS acquired the COT 802b, the BS may assign the UE with a different traffic priority for the UL schedule that was granted earlier by the UL scheduling grant 814.

Figure 9:
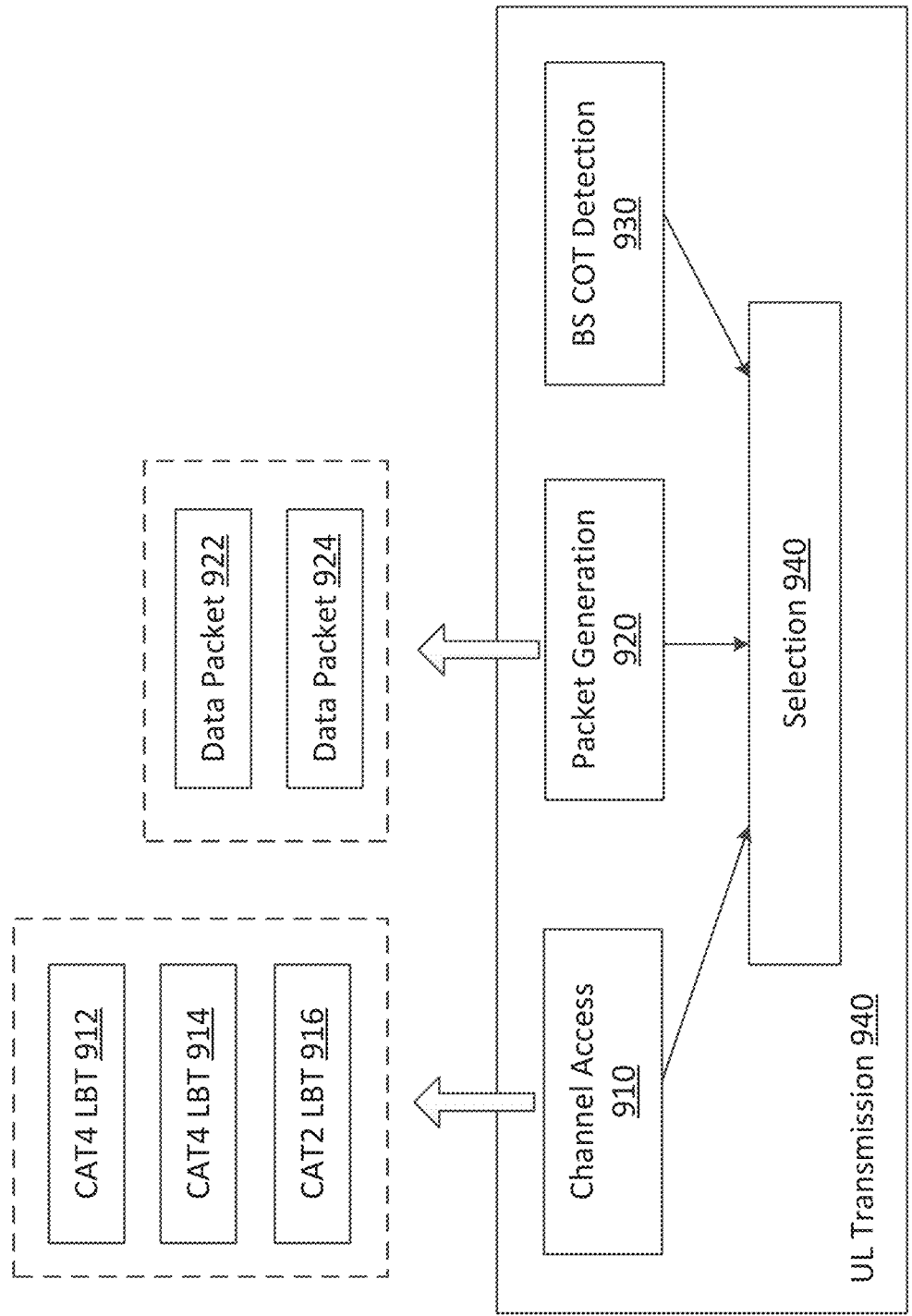
FIG. 9 illustrates a UL transmission component according to some embodiments of the present disclosure.

FIG. 9 illustrates a UL transmission component 900 according to some embodiments of the present disclosure. The UL transmission component 900 may be implemented by a UE (e.g., UE 115 in FIG. 1 or UE 300 in FIG. 3) for UL transmission in a network (e.g., the network 100). In particular, the UL transmission component 900 can be included in the COT sharing module 308 of FIG. 3. The UL transmission component 900 includes a channel access component 910, a packet generation component 920, a BS COT detection component 930, and a selection component

940. The channel access component 910, the packet generation component 920, the BS COT detection component 930, and the selection component 940 may be implemented using a combination of hardware and/or software.

The channel access component 910 is configured to perform multiple clear channel assessments (CCAs) including LBTs of different LBT types and/or different contention window lengths. For example, the channel access component 910 is configured to perform a CAT4 LBT 912 with a first contention window length, a CAT4 LBT 912 with a second contention window length, and a CAT2 LBT 914. In some examples, the channel access component 910 may use multiple counters for performing random backoffs of various backoff periods as described above in FIG. 2.

The packet generation component 920 is configure generate multiple data packets of different priority classes (e.g., traffic priorities) and/or different sizes. For example, the packet generation component 920 is configured to generate a data packet 922 of a first priority class and a data packet 924 of a second priority class.

The BS COT detection component 930 is configured to detect the start and/or the end of a BS's COT (e.g., the COTs 202 502, 602, 702, and/or 802). The BS COT detection component 930 may detect the presence of a BS COT by monitoring DMRSs and/or any COT structure information from the BS.

In an example, when the UE receives a UL scheduling grant (e.g., the UL scheduling grants 214, 514, 614, 714, and/or 814) for a UL transmission outside of a COT of a BS (e.g., BS 105 in FIG. 1), the UE may configure the channel access component 910 to perform a CAT4 LBT 912 using a contention window length corresponding to a traffic priority (e.g., P1) assigned by the UL scheduling grant. The UE may configure the channel access component 910 to perform a CAT4 LBT 914 using a contention window length corresponding to a traffic priority (e.g., P2) lower than the assigned traffic priority. The UE may configure the channel access component 910 to perform a CAT2 LBT 916.

The UE may configure the packet generation component 920 to generate a data packet 922 from data of the assigned traffic priority P1. The packet generation component 920 may determine the size of the data packet 922 based on the UL scheduling grant (e.g., the assigned MCSs and number of allocated RBs). The UE may configure the packet generation component 920 to generate a data packet 924 from data of the lower traffic priority P2. The packet generation component 920 may generate the data packet 924 with a large data size than the data packet 922.

The UE may configure the BS COT detection component 930 to monitor for a COT from the BS and determine whether a COT including the UL scheduled is detected from the BS.

The selection component 940 is configured to determine whether to transmit the data packet 922 or the data packet 924 based on the outcomes of the CAT4 LBT 912, the CAT4 LBT 914, and the CAT2 LBT 916 and whether the UL schedule is within a COT of the BS.

For example, when the UL schedule is outside of a BS's COT and the CAT4 LBT 912 is a pass, the selection component 940 may select the data packet 922 for transmission in the scheduled time period. When the UL schedule is outside of a BS's COT and the CAT4 LBT 914 is a pass, the selection component 940 may select the data packet 924 for transmission in the scheduled time period. When the UL schedule falls back into a BS's COT and the CAT4 LBT 912 is a pass, the selection component 940 may select the data packet 922 for transmission in the scheduled time period.

In general, the channel access component 910 can be configured to perform any suitable number of LBTs of any suitable contention window lengths and the packet generation component 920 can be configured to generate any suitable number of data packets based on certain hypotheses in association with the LBTs upon receiving a UL schedule outside of a BS's COT.

Figure 10:
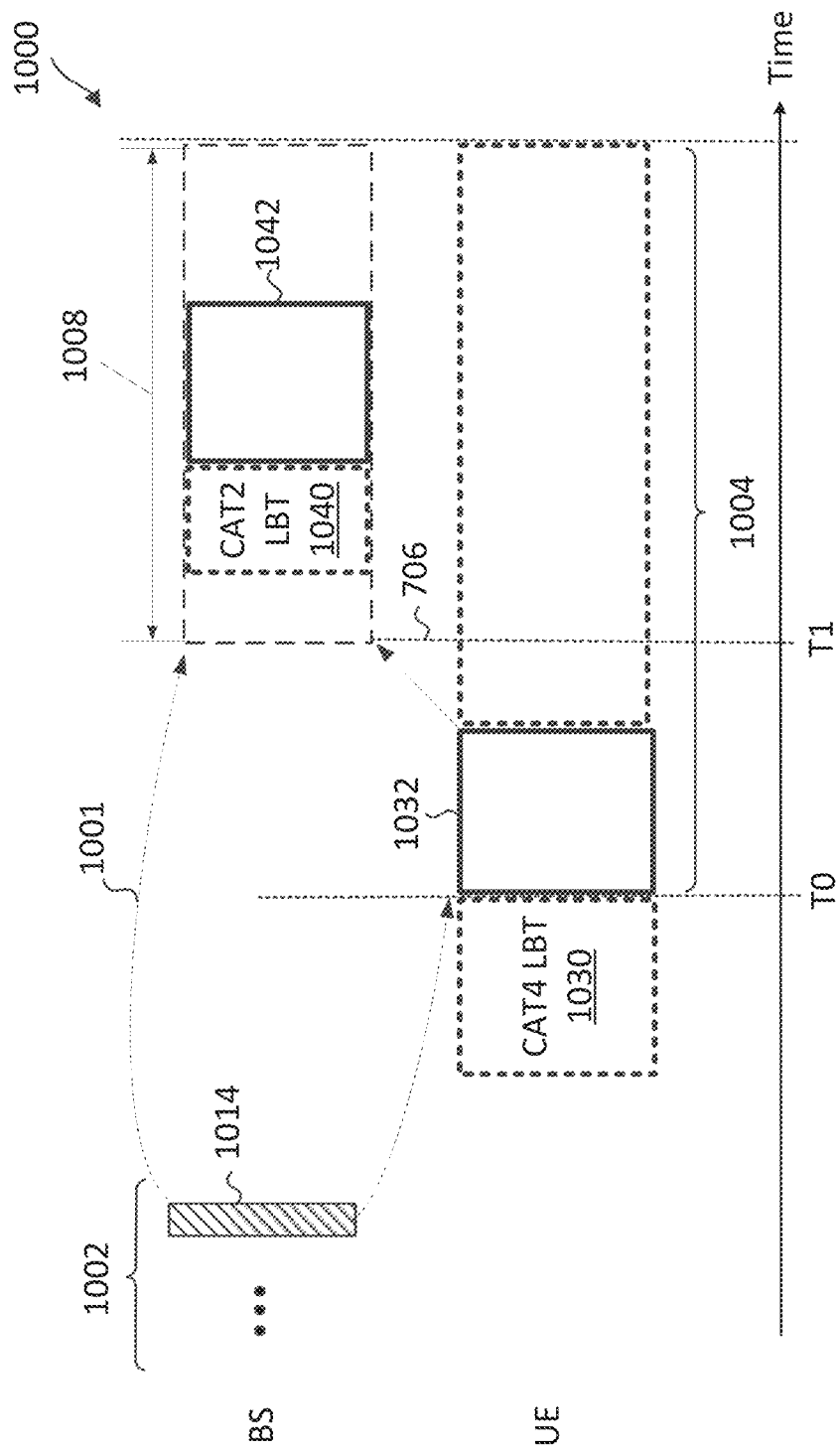
FIG. 10 is a timing diagram illustrating a scheme for sharing a COT associated with a scheduled UL transmission according to some embodiments of the present disclosure.

FIG. 10 is a timing diagram illustrating a scheme 1000 for sharing a COT associated with a scheduled UL transmission according to some embodiments of the present disclosure. The scheme 1000 may be employed by BSs such as the BSs 105 and UEs such as the UEs 115 in a network such as the network 100. In particular, a BS and a UE may employ the scheme 1000 for UL-to-DL COT sharing in a frequency spectrum (e.g., an unlicensed spectrum or a shared spectrum) shared by multiple network operating entities. In FIG. 10, the x-axis represent time in some arbitrary units. In the scheme 1000, a BS (e.g., BS 105 in FIG. 1) may determine COT sharing information for sharing a COT of a UE (e.g., UE 115 in FIG. 1) instead of using COT sharing information provided by the UE. The BS and the UE may use substantially similar LBT mechanisms as in the scheme 200 described in FIG. 2 to acquire a COT.

As shown, the BS acquires a COT 1002. The BS transmits a UL scheduling grant 1014 in the COT 1002 to schedule the UE for a UL transmission at a time T0 outside of the BS's COT 1002. Upon detecting the UL scheduling grant 1014, the UE performs a CAT4 LBT 1030 prior to the scheduled time T0. Upon passing the LBT 1030, the UE gains a COT 1004 and transmits a UL communication signal according to the UL scheduling grant 1014.

Since the UL scheduling grant 1014 is determined by the BS, the BS may determine a duration of the UE's COT 1004 and a sharable portion of the UE's COT 1004 based on the UL schedule as shown by the arrow 1001. Thus, the BS may determine when the sharable portion starts (e.g., the starting time T1 1006) and a duration 1008 of the sharable portion. The BS may perform a CAT2 LBT 1040 and transmit a DL communication signal 1042 in the sharable portion of the UE's COT 1004.

Figure 11:
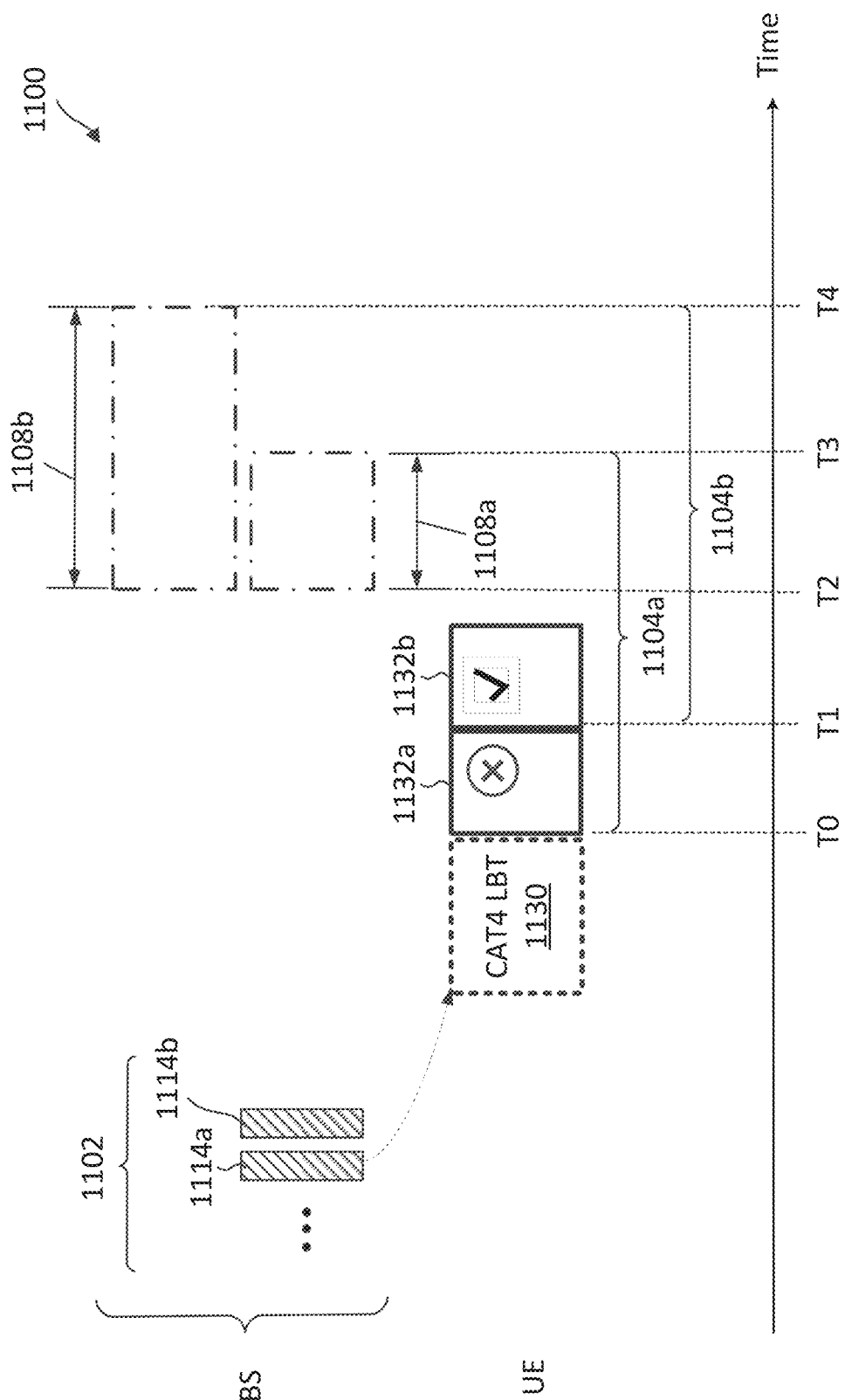
FIG. 11 is a timing diagram illustrating a scheme for sharing a COT associated with a scheduled UL transmission according to some embodiments of the present disclosure.

FIG. 11 is a timing diagram illustrating a scheme 1100 for sharing a COT associated with a scheduled UL transmission according to some embodiments of the present disclosure. The scheme 1100 may be employed by BSs such as the BSs 105 and UEs such as the UEs 115 in a network such as the network 100. In particular, a BS and a UE may employ the scheme 1100 for UL-to-DL COT sharing in a frequency spectrum (e.g., an unlicensed spectrum or a shared spectrum) shared by multiple network operating entities. In FIG. 11, the x-axis represent time in some arbitrary units. The scheme 1100 is substantially similar to the scheme 1000 and illustrates a scenario where a BS (e.g., BS 105 in FIG. 1) may schedule a UE (e.g., UE 115 in FIG. 1) with back-to-back UL transmissions outside of a COT of the BS. The BS and the UE may use substantially similar LBT mechanisms as in the scheme 200 described in FIG. 2 to acquire a COT.

As shown, the BS acquires a COT 1102. The BS transmits a plurality of UL scheduling grants 1114 (shown as 1114a and 1114b) in the COT 1102 to schedule the UE for UL transmissions in consecutive periods or transmission slots outside of the BS's COT 1002. For example, the UL scheduling grant 1114a is for a UL schedule at time T0 and the UL scheduling grant 1114b is for a UL schedule at time T1. The UE performs a CAT4 LBT 1130 prior to the scheduled time T0. The CAT4 LBT 1130 may fail, and thus the UE may not be able to transmit a UL communication signal 1032a scheduled by the UL scheduling grant 1114 as shown by the cross. The UE may pass a CAT4 LBT later prior to time T1. Thus, the UE transmits a UL communication signal 1132b beginning at time T1 based on the UL scheduling grant 1114b as shown by the checked mark.

In a first option, the BS may determine a start of a UE's COT (e.g., the COT 1104a) based on the scheduled time T0 and determine a sharable COT (e.g., starting at time T2 with a duration 1008a) from the UE's COT 1104a. The BS may transmit a DL communication signal similar to the DL communication signals 542, 642, and 1042 during the COT 1104a. However, since the UE initially failed the CAT4 LBT 1130, the UE gains a COT 1104b staring at time T1 instead, and thus the BS can potentially share a longer portion (e.g., in the COT 1104b)

In a second option, the BS may determine a start of a UEs COT based on a detection of a DMRS from the UE and/or a decoding of UCI received from the UE. Thus, the BS may detect a DMRS and/or UCI of the UL communication signal 1032b. The UCI decoding may include cyclic redundancy check (CRC) and thus may have a low false detection. The DMRS detection may have a lower detection reliability than the UCI decoding. As such, the BS may determine that the UE started a COT (e.g., the COT 1004b) at time T1 and determine a sharable COT (e.g., starting at time T2) from the UE's COT 1104b.

In some instances, the UE may transmit the UL communication signal 1132a, but the BS may fail to detect the UL communication signal 1132a. Thus, the BS may incorrectly determine that the UE's COT starts at time T1 instead of time T0. In some embodiments, the BS may select between the first option and the second option based on a traffic priority assigned for the schedule at time T0 and T1.

Figure 12:
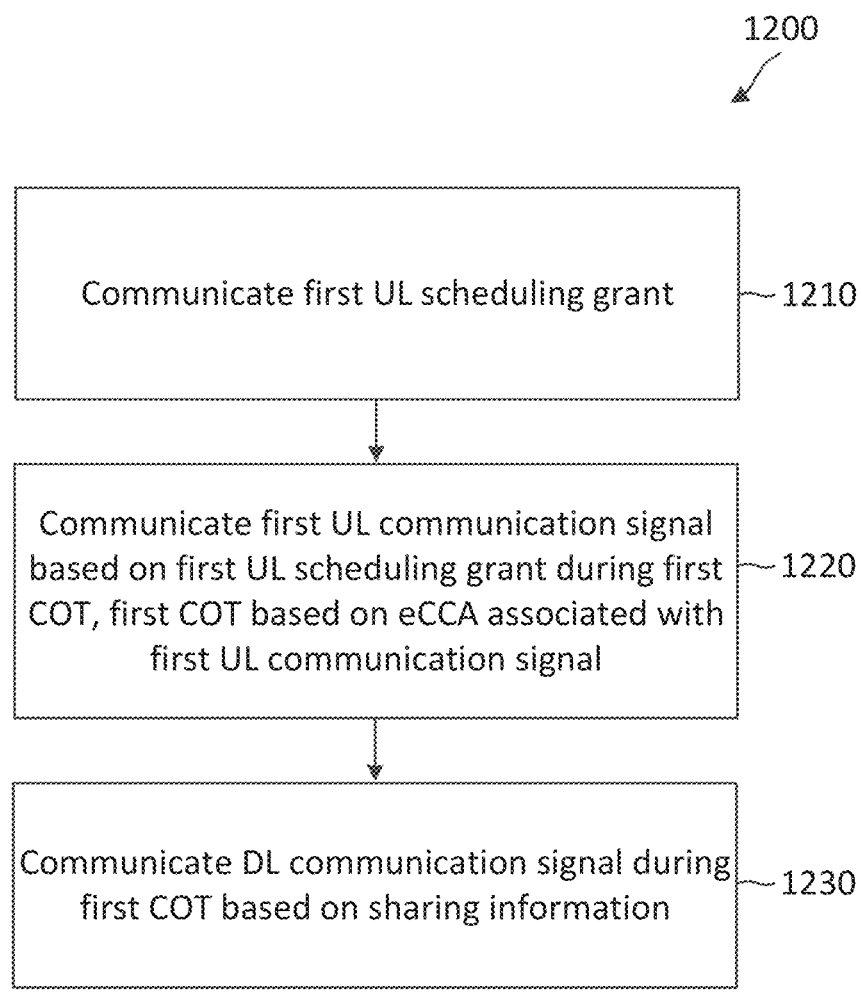
FIG. 12 is a flow diagram of a communication method according to some embodiments of the present disclosure.

FIG. 12 is a flow diagram of a communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115 or UE 300, and may utilize one or more components, such as the processor 302, the memory 304, the COT sharing module 308, the transceiver 310, the modem 312, the one or more antennas 316, and the UL transmission component 900 to execute the steps of method 1200. In another example, a wireless communication device, such as the BS 105 or BS 400, may utilize one or more components, such as the processor 402, the memory 404, the COT sharing module 408, the transceiver 410, the modem 412, and the one or more antennas 416, to execute the steps of method 1200. The method 1200 may employ similar mechanisms as in the schemes 200, 500, 600, 700, 800, 1000, and/or 1100 described with respect to FIGS. 2, 5, 6, 7, 8, 10, and/or 11, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device with a second wireless communication device, a first UL scheduling grant. The first UL scheduling grant may be similar to the UL scheduling grants 514, 614, 714, 814, 1014, and/or 1114.

At step 1220, the method includes communicating, by the first wireless communication device with the second wireless communication device, a first UL communication signal based on the first UL scheduling grant (e.g., the UL communication signals 532, 632, 732, 832a, 832b, 1032, 1132a, and/or 1132b) during a first COT (e.g., the COTs 504, 604, 804, 1004, and/or 1104). The first COT is based on an eCCA (e.g., the CAT4 LBTs 530, 630, 730, 830, 1030, and/or 1130) associated with the first UL communication signal.

At step 1230, the method includes communicating, by the first wireless communication device with the second wireless communication device, a DL communication signal (e.g., the DL communication signals during the first COT based on COT sharing information associated with the first COT.

In an embodiment, the first wireless communication device corresponds to a UE (e.g., UE 115 and/or UE 300) and the second wireless communication device corresponds to a BS (e.g., BS 105 and/or BS 400). The first wireless communication device communicates the first UL scheduling grant by receiving, from the second wireless communication device, the first UL scheduling grant during a COT (e.g., the COTs 502, 602, 702, 802, 1002, and/or 1102) of the second wireless communication device. The first wireless communication device communicates the first UL communication signal by transmitting, to the second wireless communication device, the first UL communication signal. The first COT is associated with the first wireless communication device and is located outside of a COT of the second wireless communication device.

In an embodiment, the first wireless communication device corresponds to a BS (e.g., BS 105 and/or BS 400) and the second wireless communication device corresponds to a UE (e.g., UE 115 or UE 300). The first wireless communication device communicates the first UL scheduling grant by transmitting, the second wireless communication device, the first UL scheduling grant during a COT of the second wireless communication device. The first wireless communication device communicates the first UL communication signal by receiving, from the second wireless communication device, the first UL communication signal. The first COT is associated with the second wireless communication device and is located outside of a COT of the first wireless communication device.

In an embodiment, the UL communication signal includes the COT sharing information (e.g., the COT sharing information 534, 634, 734, and/or 834). In an embodiment, the UL communication signal is communicated during a first portion of the first COT and the DL communication signal is communicated during a shared portion of the first COT. The first portion is different from the shared portion. The COT sharing information includes at least one of a starting time (e.g., the starting time 506, 706, 806, 1006, and/or 1106) or a duration (e.g., the duration 508, 708, 808, 1008, and/or 1108) of the first COT. In an embodiment, the first UL scheduling grant indicates a first traffic priority. The UL communication signal further includes UL data associated with a second traffic priority different from the first traffic priority and the COT sharing information indicates the second traffic priority. In an embodiment, the first wireless communication device performs the eCCA based on the second traffic priority. In an embodiment, the first wireless communication device communicates, with the second wireless communication device, a plurality of scheduling grants (e.g., the UL scheduling grants 632a, 632b, and/or 632c) for communicating a plurality of UL communication signals (e.g., the UL communication signals 632a, 632b, and/or 632c) in consecutive periods, the plurality of scheduling grants including the first UL scheduling grant. The first wireless communication device communicates, with the second wireless communication device, a second UL communication signal of the plurality of UL communication signals based on a second UL scheduling grant of the plurality of scheduling grants during a period of the consecutive periods within the first COT. In an embodiment, the first UL scheduling grant includes a request for the COT sharing information, and wherein the second UL scheduling grant does not include a request for the COT sharing information. In an embodiment, the first UL scheduling grant includes a request for UL control information including the COT sharing information and at least one of an ACK/NACK feedback or channel information.

In an embodiment, first wireless communication device receives, from the second wireless communication device, a second UL scheduling grant for outside of a COT of the second wireless communication device, the second UL scheduling grant indicating a first traffic priority. The first wireless communication device performs a plurality of LBTs based on different contention window lengths. The first wireless communication device generates a first UL data block based on the first traffic priority. The first wireless communication device generates a second UL data block based on a second traffic priority different from the first traffic priority. The first wireless communication device transmits, to the second wireless communication device in response to the second UL scheduling grant, the first UL data block or the second UL data block based on at least one of the plurality of CCAs or a detection of another COT of the second wireless communication device.

In an embodiment, the first wireless communication device determines the COT sharing information based on the first UL scheduling grant. In an embodiment, the first wireless communication device communicates the DL communication signal by transmitting, to the second wireless communication device, the DL communication signal based at least in part on the determined COT sharing information. In an embodiment, the DL communication signal is communicated based on a detection of the first UL communication signal. In an embodiment, the detection is based on a detection of at least one of a reference signal or UL control information associated with the first UL communication signal. In an embodiment, the first wireless communication device transmits, to the second wireless communication device, a plurality of scheduling grants for communicating a plurality of UL communication signals in consecutive periods outside of a COT of the first wireless communication device, the plurality of scheduling grants including the first UL scheduling grant. In an embodiment, the DL communication signal is communicated based on a detection of one or more UL communication signals of the plurality UL communication signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method of wireless communication also includes communicating, by a first wireless communication device with a second wireless communication device, a first uplink (UL) scheduling grant. The method of wireless communication also includes communicating, by the first wireless communication device with the second wireless communication device, a first UL communication signal based on the first UL scheduling grant during a first channel occupancy time (COT), the first COT based on an extended clear channel assessment (eCCA) associated with the first UL communication signal. The method of wireless communication also includes communicating, by the first wireless communication device with the second wireless communication device, a downlink (DL) communication signal during the first COT based on COT sharing information associated with the first COT.

In some aspects, the may also include where the communicating the first UL scheduling grant includes receiving, by the first wireless communication device from the second wireless communication device, the first UL scheduling grant during a COT of the second wireless communication device, where the first COT is associated with the first wireless communication device and located outside of the COT of the second wireless communication device, and the communicating the first UL communication signal includes transmitting, by the first wireless communication device to the second wireless communication device, the first UL communication signal. The communicating the first UL scheduling grant includes transmitting, by the first wireless communication device to the second wireless communication device, the first UL scheduling grant during a COT of the second wireless communication device, where the first COT is associated with the second wireless communication device and located outside of the COT of the first wireless communication device, and the communicating the first UL communication signal includes receiving, by the first wireless communication device from the second wireless communication device, the first UL communication signal. The UL communication signal includes the COT sharing information. The communicating the first UL communication signal includes communicating, by the first wireless communication device with the second wireless communication device, the first UL communication signal during a first portion of the first COT, and the communicating the DL communication signal includes communicating, by the first wireless communication device with the second wireless communication device, the DL communication signal during a shared portion of the first COT, the first portion being different from the shared portion, and the COT sharing information includes at least one of a starting time or a duration of the shared portion. The first UL scheduling grant indicates a first traffic priority, where the UL communication signal further includes UL data associated with a second traffic priority different from the first traffic priority, and where the COT sharing information indicates the second traffic priority. The method may include performing, by the first wireless communication device, the eCCA based on the second traffic priority. The method may include communicating, by the first wireless communication device with the second wireless communication device, a plurality of scheduling grants for communicating a plurality of UL communication signals in consecutive periods, the plurality of scheduling grants including the first UL scheduling grant; and communicating, by the first wireless communication device with the second wireless communication device, a second UL communication signal of the plurality of UL communication signals based on a second UL scheduling grant of the plurality of scheduling grants during a period of the consecutive periods within the first COT. The first UL scheduling grant includes a request for the COT sharing information, and where the second UL scheduling grant does not include a request for the COT sharing information. The first UL scheduling grant includes a request for UL control information including the COT sharing information and at least one of an acknowledgement/negative acknowledgement (ACK/NACK) feedback or channel information. The method may include receiving, by the first wireless communication device from the second wireless communication device, a second UL scheduling grant for outside of a COT of the second wireless communication device, the second UL scheduling grant indicating a first traffic priority; performing, by the first wireless communication device, a plurality of clear channel assessments (CCAs) based on different contention window lengths; generating, by the first wireless communication device, a first UL data block based on the first traffic priority; generating, by the first wireless communication device, a second UL data block based on a second traffic priority different from the first traffic priority; and transmitting, by the first wireless communication device to the second wireless communication device in response to the second UL scheduling grant, the first UL data block or the second UL data block based on at least one of the plurality of CCAs or a detection of another COT of the second wireless communication device. The method may include determining, by the first wireless communication device, the COT sharing information based on the first UL scheduling grant. The communicating the DL communication signal includes transmitting, by the first wireless communication device to the second wireless communication device, the DL communication signal based at least in part on the determined COT sharing information. The communicating the DL communication signal is further based on a detection of the first UL communication signal. The detection is based on a detection of at least one of a reference signal or UL control information associated with the first UL communication signal. The method may include transmitting, by the first wireless communication device to the second wireless communication device, a plurality of scheduling grants for communicating a plurality of UL communication signals in consecutive periods outside of a COT of the first wireless communication device, the plurality of scheduling grants including the first UL scheduling grant. The communicating the DL communication signal is further based on a detection of one or more UL communication signals of the plurality UL communication signals.

Further embodiments of the present disclosure include an a transceiver configured to communicate, with a wireless communication device, a first UL scheduling grant; communicate, with the wireless communication device, a first uplink (UL) communication signal based on the first UL scheduling grant during a first channel occupancy time (COT), the first COT based on an extended clear channel assessment (eCCA) associated with the first UL communication signal; and communicate, with the wireless communication device, a downlink (DL) communication signal during the first COT based on COT sharing information associated with the first COT.

In some aspects, the apparatus may also include where the transceiver configured to communicate the first UL scheduling grant is further configured to receiving, from the wireless communication device, the first UL scheduling grant during a COT of the wireless communication device, where the first COT is associated with the apparatus and located outside of the COT of the wireless communication device, and the transceiver configured to communicate the first UL communication signal is further configured to transmit, to the wireless communication device, the first UL communication signal. The transceiver configured to communicate the first UL scheduling grant is further configured to transmit, to the wireless communication device, the first UL scheduling grant during a COT of the wireless communication device, where the first COT is associated with the wireless communication device and located outside of the COT of the apparatus, and the transceiver configured to communicate the first UL communication signal is further configured to receive, from the wireless communication device, the first UL communication signal. The UL communication signal includes the COT sharing information. The transceiver configured to communicate the first UL communication signal is further configured to communicate, with the wireless communication device, the first UL communication signal during a first portion of the first COT, and the transceiver configured to communicate the DL communication signal is further configured to communicate, with the wireless communication device, the DL communication signal during a shared portion of the first COT, the first portion being different from the shared portion, and the COT sharing information includes at least one of a starting time or a duration of the shared portion. The first UL scheduling grant indicates a first traffic priority, where the UL communication signal further includes UL data associated with a second traffic priority different from the first traffic priority, and where the COT sharing information indicates the second traffic priority. The apparatus may include a processor configured to perform the eCCA based on the second traffic priority. The transceiver is further configured to communicate, with the wireless communication device, a plurality of scheduling grants for communicating a plurality of UL communication signals in consecutive periods, the plurality of scheduling grants including the first UL scheduling grant; and communicate, with the wireless communication device, a second UL communication signal of the plurality of UL communication signals based on a second UL scheduling grant of the plurality of scheduling grants during a period of the consecutive periods within the first COT. The first UL scheduling grant includes a request for the COT sharing information, and where the second UL scheduling grant does not include a request for the COT sharing information. The first UL scheduling grant includes a request for UL control information including the COT sharing information and at least one of an acknowledgement/negative acknowledgement (ACK/NACK) feedback or channel information. The transceiver is further configured to receive, from the wireless communication device, a second UL scheduling grant for outside of a COT of the wireless communication device, the second UL scheduling grant indicating a first traffic priority, and the apparatus further includes a processor configured to perform a plurality of clear channel assessments (CCAs) based on different contention window lengths; generate a first UL data block based on the first traffic priority; and generate a second UL data block based on a second traffic priority different from the first traffic priority, and the transceiver is further configured to transmit, to the wireless communication device in response to the second UL scheduling grant, the first UL data block or the second UL data block based on at least one of the plurality of CCAs or a detection of another COT of the wireless communication device. The apparatus may include a processor configured to determine the COT sharing information based on the first UL scheduling grant. The transceiver configured to communicate the DL communication signal is further configured to transmit, to the wireless communication device, the DL communication signal based at least in part on the determined COT sharing information. The transceiver configured to communicate the DL communication signal is further configured to communicate the DL communication signal based on a detection of the first UL communication signal. The detection is based on a detection of at least one of a reference signal or UL control information associated with the first UL communication signal. The transceiver is further configured to transmit, to the wireless communication device, a plurality of scheduling grants for communicating a plurality of UL communication signals in consecutive periods outside of a COT of the apparatus, the plurality of scheduling grants including the first UL scheduling grant. The transceiver configured to communicate the DL communication signal is further configured to communicate the DL communication signal based on a detection of one or more UL communication signals of the plurality UL communication signals.

Further embodiments of the present disclosure include a non-transitory computer-readable medium having program code recorded thereon. The non-transitory computer-readable medium also includes code for causing a first wireless communication device to communicate, with a second wireless communication device, a first uplink (UL) scheduling grant. The non-transitory computer-readable medium also includes code for causing the first wireless communication device to communicate, with the second wireless communication device, a first UL communication signal based on the first UL scheduling grant during a first channel occupancy time (COT), the first COT based on an extended clear channel assessment (eCCA) associated with the first UL communication signal. The non-transitory computer-readable medium also includes code for causing the first wireless communication device to communicate, with the second wireless communication device, a downlink (DL) communication signal during the first COT based on COT sharing information associated with the first COT.

In some aspects, the non-transitory computer-readable medium may also include where the code for causing the first wireless communication device to communicate the first UL scheduling grant is further configured to receive, from the second wireless communication device, the first UL scheduling grant during a COT of the second wireless communication device, where the first COT is associated with the first wireless communication device and located outside of the COT of the second wireless communication device, and the code for causing the first wireless communication device to communicate the first UL communication signal is further configured to transmit, to the second wireless communication device, the first UL communication signal. The code for causing the first wireless communication device to communicate the first UL scheduling grant is further configured to transmit, to the second wireless communication device, the first UL scheduling grant during a COT of the second wireless communication device, where the first COT is associated with the second wireless communication device and located outside of the COT of the first wireless communication device, and the code for causing the first wireless communication device to communicate the first UL communication signal is further configured to receive, from the second wireless communication device, the first UL communication signal. The UL communication signal includes the COT sharing information. The code for causing the first wireless communication device to communicate the first UL communication signal is further configured to communicate, with the second wireless communication device, the first UL communication signal during a first portion of the first COT, and the code for causing the first wireless communication device to communicate the DL communication signal is further configured to communicate, with the second wireless communication device, the DL communication signal during a shared portion of the first COT, the first portion being different from the shared portion, and the COT sharing information includes at least one of a starting time or a duration of the shared portion. The first UL scheduling grant indicates a first traffic priority, where the UL communication signal further includes UL data associated with a second traffic priority different from the first traffic priority, and where the COT sharing information indicates the second traffic priority. The non-transitory computer-readable medium may include code for causing the first wireless communication device to perform the eCCA based on the second traffic priority. The non-transitory computer-readable medium may include code for causing the first wireless communication device to communicate, with the second wireless communication device, a plurality of scheduling grants for communicating a plurality of UL communication signals in consecutive periods, the plurality of scheduling grants including the first UL scheduling grant; and code for causing the first wireless communication device to communicate, with the second wireless communication device, a second UL communication signal of the plurality of UL communication signals based on a second UL scheduling grant of the plurality of scheduling grants during a period of the consecutive periods within the first COT. The first UL scheduling grant includes a request for the COT sharing information, and where the second UL scheduling grant does not include a request for the COT sharing information. The first UL scheduling grant includes a request for UL control information including the COT sharing information and at least one of an acknowledgement/negative acknowledgement (ACK/NACK) feedback or channel information. The non-transitory computer-readable medium may include code for causing the first wireless communication device to receive, from the second wireless communication device, a second UL scheduling grant for outside of a COT of the second wireless communication device, the second UL scheduling grant indicating a first traffic priority; code for causing the first wireless communication device to perform a plurality of clear channel assessments (CCAs) based on different contention window lengths; code for causing the first wireless communication device to generate a first UL data block based on the first traffic priority; code for causing the first wireless communication device to generate a second UL data block based on a second traffic priority different from the first traffic priority; and code for causing the first wireless communication device to transmit, to the second wireless communication device in response to the second UL scheduling grant, the first UL data block or the second UL data block based on at least one of the plurality of CCAs or a detection of another COT of the second wireless communication device. The non-transitory computer-readable medium may include code for causing the first wireless communication device to determine the COT sharing information based on the first UL scheduling grant. The code for causing the first wireless communication device to communicate the DL communication signal is further configured to transmit, to the second wireless communication device, the DL communication signal based at least in part on the determined COT sharing information. The code for causing the first wireless communication device to communicate the DL communication signal is further configured to communicate the DL communication signal based on a detection of the first UL communication signal. The detection is based on a detection of at least one of a reference signal or UL control information associated with the first UL communication signal. The non-transitory computer-readable medium may include code for causing the first wireless communication device to transmit, to the second wireless communication device, a plurality of scheduling grants for communicating a plurality of UL communication signals in consecutive periods outside of a COT of the first wireless communication device, the plurality of scheduling grants including the first UL scheduling grant. The code for causing the first wireless communication device to communicate the DL communication signal is further configured to communicate the DL communication signal based on a detection of one or more UL communication signals of the plurality UL communication signals.

Further embodiments of the present disclosure include an apparatus including means for communicating, with a wireless communication device, a first uplink (UL) scheduling grant. The apparatus also includes means for communicating, with the wireless communication device, a first UL communication signal based on the first UL scheduling grant during a first channel occupancy time (COT), the first COT based on an extended clear channel assessment (eCCA) associated with the first UL communication signal. The apparatus also includes means for communicating, with the wireless communication device, a downlink (DL) communication signal during the first COT based on COT sharing information associated with the first COT.

In some aspects, the apparatus may also include where the means for communicating the first UL scheduling grant is further configured to receive, from the wireless communication device, the first UL scheduling grant during a COT of the wireless communication device, where the first COT is associated with apparatus and located outside of the COT of the wireless communication device, and the means for communicating the first UL communication signal is further configured to transmit, to the wireless communication device, the first UL communication signal. The means for communicating the first UL scheduling grant is further configured to transmit, to the wireless communication device, the first UL scheduling grant during a COT of the wireless communication device, where the first COT is associated with the wireless communication device and located outside of the COT of the apparatus, and the means for communicating the first UL communication signal is further configured to receive, from the wireless communication device, the first UL communication signal. The UL communication signal includes the COT sharing information. The means for communicating the first UL communication signal is further configured to communicate, with the wireless communication device, the first UL communication signal during a first portion of the first COT, and the means for communicating the DL communication signal is further configured to communicate, with the wireless communication device, the DL communication signal during a shared portion of the first COT, the first portion being different from the shared portion, and the COT sharing information includes at least one of a starting time or a duration of the shared portion. The first UL scheduling grant indicates a first traffic priority, where the UL communication signal further includes UL data associated with a second traffic priority different from the first traffic priority, and where the COT sharing information indicates the second traffic priority. The apparatus may include means for performing the eCCA based on the second traffic priority. The apparatus may include means for communicating, with the wireless communication device, a plurality of scheduling grants for communicating a plurality of UL communication signals in consecutive periods, the plurality of scheduling grants including the first UL scheduling grant; and means for communicating, with the wireless communication device, a second UL communication signal of the plurality of UL communication signals based on a second UL scheduling grant of the plurality of scheduling grants during a period of the consecutive periods within the first COT. The first UL scheduling grant includes a request for the COT sharing information, and where the second UL scheduling grant does not include a request for the COT sharing information. The first UL scheduling grant includes a request for UL control information including the COT sharing information and at least one of an acknowledgement/negative acknowledgement (ACK/NACK) feedback or channel information. The apparatus may include means for receiving, from the wireless communication device, a second UL scheduling grant for outside of a COT of the wireless communication device, the second UL scheduling grant indicating a first traffic priority; means for performing a plurality of clear channel assessments (CCAs) based on different contention window lengths; means for generating a first UL data block based on the first traffic priority; means for generating a second UL data block based on a second traffic priority different from the first traffic priority; and means for transmitting, to the wireless communication device in response to the second UL scheduling grant, the first UL data block or the second UL data block based on at least one of the plurality of CCAs or a detection of another COT of the wireless communication device. The apparatus may include means for determining the COT sharing information based on the first UL scheduling grant. The means for communicating the DL communication signal is further configured to transmit, to the wireless communication device, the DL communication signal based at least in part on the determined COT sharing information. The means for communicating the DL communication signal is further configured to communicate the DL communication signal based on a detection of the first UL communication signal. The detection is based on a detection of at least one of a reference signal or UL control information associated with the first UL communication signal. The apparatus may include means for transmitting, to the wireless communication device, a plurality of scheduling grants for communicating a plurality of UL communication signals in consecutive periods outside of a COT of the apparatus, the plurality of scheduling grants including the first UL scheduling grant. The communicating the DL communication signal is further configured to communicate the DL communication signal based on a detection of one or more UL communication signals of the plurality UL communication signals.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a first uplink (UL) scheduling grant;
communicating, by the first wireless communication device with the second wireless communication device, a first UL communication signal based on the first UL scheduling grant during a first channel occupancy time (COT), the first COT based on an extended clear channel assessment (eCCA) associated with the first UL communication signal; and
communicating, by the first wireless communication device with the second wireless communication device during the first COT after a listen-before-talk (LBT) gap from an end of the first UL communication signal, a downlink (DL) communication signal based on COT sharing information associated with the first COT.

2. The method of claim 1, wherein:
the first wireless communication device is a user equipment (UE),
the second wireless communication device is a base station (BS),
the communicating the first UL scheduling grant includes:
receiving, by the UE from the BS, the first UL scheduling grant during a COT of the BS, wherein the first COT is associated with the UE and located outside of the COT of the BS,
the communicating the first UL communication signal includes:
transmitting, by the UE to the BS, the first UL communication signal, and the communicating the DL communication signal includes:
receiving, by the UE from the BS during the first COT of the UE after the LBT gap from the end of the first UL communication signal, the DL communication signal.

3. The method of claim 1, wherein:
the first wireless communication device is a base station (BS),
the second wireless communication device is a user equipment (UE),
the communicating the first UL scheduling grant includes:
transmitting, by the BS to the UE, the first UL scheduling grant during a COT of the BS, wherein the first COT is associated with the UE and located outside of the COT of the BS,
the communicating the first UL communication signal includes:
receiving, by the BS from the UE, the first UL communication signal, and
the communicating the DL communication signal includes:
transmitting, by the BS to the UE during the first COT of the UE after the LBT gap from the end of the first UL communication signal, the DL communication signal.

4. The method of claim 1, wherein:
the communicating the first UL communication signal includes:
communicating, by the first wireless communication device with the second wireless communication device, the first UL communication signal during a first portion of the first COT, and
the communicating the DL communication signal includes:
communicating, by the first wireless communication device with the second wireless communication device, the DL communication signal during a shared portion of the first COT, the first portion being different from the shared portion, and
the COT sharing information includes at least one of a starting time or a duration of the shared portion.

5. The method of claim 1, further comprising:
determining, by the first wireless communication device, the COT sharing information based on the first UL scheduling grant.

6. The method of claim 1, wherein the communicating the DL communication signal includes:
transmitting, by the first wireless communication device to the second wireless communication device after the first UL communication signal, the DL communication signal further based on first UL scheduling grant.

7. The method of claim 6, further comprising:
determining, by the first wireless communication device, whether to perform an LBT before transmitting the DL communication signal based on whether a transmission gap between the first UL communication signal and the DL communication signal is 16 microseconds or longer.

8. The method of claim 7, further comprising:
performing, by the first wireless communication device, the LBT before transmitting the DL communication signal based on the determining.

9. The method of claim 1, wherein the communicating the DL communication signal is further based on a detection of the first UL communication signal.

10. The method of claim 9, wherein the detection is based on a detection of at least one of a reference signal or UL control information associated with the first UL communication signal.

11. The method of claim 1, further comprising:
transmitting, by the first wireless communication device to the second wireless communication device, a plurality of scheduling grants for communicating a plurality of UL communication signals in consecutive periods outside of a COT of the first wireless communication device, the plurality of scheduling grants including the first UL scheduling grant.

12. The method of claim 11, further comprising:
   determining, by the first wireless communication device, a COT sharing duration within the first COT for communicating the DL communication signal based on a detection of one or more UL communication signals of the plurality of UL communication signals.

13. The method of claim 12, wherein the determining the COT sharing duration is further based on whether uplink control information (UCI) or a demodulation reference signal (DMRS) is detected from one or more UL communication signals of the plurality of UL communication signals.

14. The method of claim 11, further comprising:
   determining, by the first wireless communication device, a COT sharing duration within the first COT for communicating the DL communication signal based on an earliest transmission time scheduled by the plurality of scheduling grants.

15. An apparatus comprising:
   a transceiver configured to:
      communicate, with a wireless communication device, a first uplink (UL) scheduling grant;
      communicate, with the wireless communication device, a first UL communication signal based on the first UL scheduling grant during a first channel occupancy time (COT), the first COT based on an extended clear channel assessment (eCCA) associated with the first UL communication signal; and
      communicate, with the wireless communication device during the first COT after a listen-before-talk (LBT) gap from an end of the first UL communication signal, a downlink (DL) communication signal during the first COT based on COT sharing information associated with the first COT.

16. The apparatus of claim 15, wherein:
   the apparatus is a user equipment (UE),
   the wireless communication device is a base station (BS),
   the transceiver configured to communicate the first UL scheduling grant is configured to:
      receive, from the BS, the first UL scheduling grant during a COT of the BS, wherein the first COT is associated with the UE and located outside of the COT of the BS,
   the transceiver configured to communicate the first UL communication signal is configured to:
      transmit, to the BS, the first UL communication signal, and
   the transceiver configured to communicate the DL communication signal is configured to:
      receive, from the BS during the first COT of the UE after the LBT gap from the end of the first UL communication signal, the DL communication signal.

17. The apparatus of claim 15, wherein:
   the apparatus is a base station (BS),
   the wireless communication device is a user equipment (UE),
   the transceiver configured to communicate the first UL scheduling grant is configured to:
      transmit, to the UE, the first UL scheduling grant during a COT of the BS, wherein the first COT is associated with the UE and located outside of the COT of the BS,
   the transceiver configured to communicate the first UL communication signal is configured to:
      receive, from the UE, the first UL communication signal, and
   the transceiver configured to communicate the DL communication signal is configured to:
      transmit, to the UE during the first COT of the UE after the LBT gap from the end of the first UL communication signal, the DL communication signal.

18. The apparatus of claim 15, wherein:
   the transceiver configured to communicate the first UL communication signal is configured to:
      communicate, with the wireless communication device, the first UL communication signal during a first portion of the first COT, and
   the transceiver configured to communicate the DL communication signal is configured to:
      communicate, with the wireless communication device, the DL communication signal during a shared portion of the first COT, the first portion being different from the shared portion, and
   the COT sharing information includes at least one of a starting time or a duration of the shared portion.

19. The apparatus of claim 15, further comprising:
   a processor configured to determine the COT sharing information based on the first UL scheduling grant.

20. The apparatus of claim 15, wherein the transceiver configured to communicate the DL communication signal is configured to:
   transmit, to the wireless communication device after the first UL communication signal, the DL communication signal further based on first UL scheduling grant.

21. The apparatus of claim 15, wherein the transceiver configured to communicate the DL communication signal is further configured to:
   communicate, with the wireless communication device, the DL communication signal based on a detection of the first UL communication signal.

22. The apparatus of claim 15, wherein:
   the transceiver is further configured to:
      transmit, to the wireless communication device, a plurality of scheduling grants for communicating a plurality of UL communication signals in consecutive periods outside of a COT of the apparatus, the plurality of scheduling grants including the first UL scheduling grant; and
   the apparatus further comprising:
      a processor configured to determine a COT sharing duration within the first COT for communicating the DL communication signal based on at least one of:
         a detection of one or more UL communication signals of the plurality of UL communication signals;
         whether uplink control information (UCI) or a demodulation reference signal (DMRS) is detected from one or more UL communication signals of the plurality of UL communication signals; or
         an earliest transmission time scheduled by the plurality of scheduling grants.

23. A non-transitory computer-readable medium having program code recorded thereon, the program code comprising:
   code for causing a first wireless communication device to communicate, with a second wireless communication device, a first uplink (UL) scheduling grant;
   code for causing the first wireless communication device to communicate, with the second wireless communication device, a first UL communication signal based on the first UL scheduling grant during a first channel occupancy time (COT), the first COT based on an extended clear channel assessment (eCCA) associated with the first UL communication signal; and code for causing the first wireless communication device to communicate, with the second wireless communication device during the first COT after a listen-before-talk (LBT) gap from an end of the first UL communication signal, a downlink (DL) communication signal during the first COT based on COT sharing information associated with the first COT.

24. The non-transitory computer-readable medium of claim 23, wherein:
the first wireless communication device is a user equipment (UE),
the second wireless communication device is a base station (BS),
the code for causing the first wireless communication device to communicate the first UL scheduling grant is configured to:
receive, from the BS, the first UL scheduling grant during a COT of the BS, wherein the first COT is associated with the UE and located outside of the COT of the BS; and
the code for causing the first wireless communication device to communicate the first UL communication signal is configured to:
transmit, to the BS, the first UL communication signal, and
the code for causing the first wireless communication device to communicate the DL communication signal is configured to:
receive, from the BS during the first COT of the UE after the LBT gap from the end of the first UL communication signal, the DL communication signal.

25. The non-transitory computer-readable medium of claim 23, wherein:
the first wireless communication device is a base station (BS),
the second wireless communication device is a user equipment (UE),
the code for causing the first wireless communication device to communicate the first UL scheduling grant is configured to:
transmit, to the UE, the first UL scheduling grant during a COT of the UE, wherein the first COT is associated with the UE and located outside of the COT of the BS,
the code for causing the first wireless communication device to communicate the first UL communication signal is configured to:
receive, from the UE, the first UL communication signal, and
the code for causing the first wireless communication device to communicate the DL communication signal is configured to:
transmit, to the UE during the first COT of the UE after the LBT gap from the end of the first UL communication signal, the DL communication signal.

26. The non-transitory computer-readable medium of claim 23, wherein:
the code for causing the first wireless communication device to communicate the first UL communication signal is configured to:
communicate, with the second wireless communication device, the first UL communication signal during a first portion of the first COT, and
the code for causing the first wireless communication device to communicate the DL communication signal is configured to:
communicate, with the second wireless communication device, the DL communication signal during a shared portion of the first COT, the first portion being different from the shared portion, and
the COT sharing information includes at least one of a starting time or a duration of the shared portion.

27. The non-transitory computer-readable medium of claim 23, further comprising:
code for causing the first wireless communication device to determine the COT sharing information based on the first UL scheduling grant.

28. The non-transitory computer-readable medium of claim 23, wherein the code for causing the first wireless communication device to communicate the DL communication signal is configured to:
transmit, to the second wireless communication device after the first UL communication signal, the DL communication signal further based on first UL scheduling grant.

29. The non-transitory computer-readable medium of claim 23, wherein the code for causing the first wireless communication device to communicate the DL communication signal is further configured to:
communicate, with the second wireless communication device, the DL communication signal based on a detection of the first UL communication signal.

30. The non-transitory computer-readable medium of claim 23, further comprising:
code for causing the first wireless communication device to transmit, to the second wireless communication device, a plurality of scheduling grants for communicating a plurality of UL communication signals in consecutive periods outside of a COT of the first wireless communication device, the plurality of scheduling grants including the first UL scheduling grant; and
code for causing the first wireless communication device to determine a COT sharing duration within the first COT for communicating the DL communication signal based on at least one of:
a detection of one or more UL communication signals of the plurality of UL communication signals;
whether uplink control information (UCI) or a demodulation reference signal (DMRS) is detected from one or more UL communication signals of the plurality of UL communication signals; or
an earliest transmission time scheduled by the plurality of scheduling grants.

* * * * *